United States Patent
Li et al.

(10) Patent No.: US 11,361,492 B2
(45) Date of Patent: Jun. 14, 2022

(54) STICKER PRESENTATION METHOD AND APPARATUS COMPUTER-READABLE STORAGE MEDIUM, AND TERMINAL

(71) Applicant: Tencent Technology (Shenzhen) Company Limited, Shenzhen (CN)

(72) Inventors: Shaofeng Li, Shenzhen (CN); Hao Wu, Shenzhen (CN); Minghao Zhu, Shenzhen (CN); Xiaoming Yang, Shenzhen (CN); Shaozu Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 51 days.

(21) Appl. No.: 16/569,507

(22) Filed: Sep. 12, 2019

(65) Prior Publication Data

US 2020/0005513 A1 Jan. 2, 2020

Related U.S. Application Data

(63) Continuation of application No. PCT/CN2018/097923, filed on Aug. 1, 2018.

(30) Foreign Application Priority Data

Aug. 10, 2017 (CN) .......................... 201710678570.X

(51) Int. Cl.
*G06T 13/80* (2011.01)
*G06F 3/0481* (2022.01)
(Continued)

(52) U.S. Cl.
CPC ............ *G06T 13/80* (2013.01); *G06F 3/0481* (2013.01); *G06F 3/04845* (2013.01);
(Continued)

(58) Field of Classification Search
None
See application file for complete search history.

(56) References Cited

U.S. PATENT DOCUMENTS

| 2014/0096037 | A1* | 4/2014 | Grosz | G06Q 10/101 |
| | | | | 715/753 |
| 2015/0277686 | A1* | 10/2015 | LaForge | G11B 27/34 |
| | | | | 715/723 |

(Continued)

FOREIGN PATENT DOCUMENTS

| CN | 102289339 A | 12/2011 |
| CN | 102870081 A | 1/2013 |

(Continued)

OTHER PUBLICATIONS

Tencent Technology, WO, PCT/CN2018/097923, dated Sep. 27, 2018, 5 pgs.

(Continued)

*Primary Examiner* — Michelle Chin
(74) *Attorney, Agent, or Firm* — Morgan, Lewis & Bockius LLP

(57) ABSTRACT

This application discloses a sticker presentation method and apparatus, a computer-readable storage medium, and a terminal and belongs to the field of Internet technologies. The method includes: determining, by a first terminal, a target animation presentation effect matching the target sticker after obtaining a message sending instruction and when detecting that a quantity of target stickers included in a sent target message satisfies an animation presentation condition, the target animation presentation effect indicating a presentation manner of at least one sticker element of the target sticker; and performing, by the first terminal, animation presentation on at least one sticker element of the target sticker on a message presentation interface according to the target animation presentation effect, content of the at least (Continued)

one sticker element being consistent with the target sticker. In this application, in addition to that presentation is performed according to an original presentation effect of a sticker, animation presentation may be performed on the at least one sticker element of the target sticker, and this sticker presentation manner is more vivid, various presentation patterns are provided, and a display effect is good.

20 Claims, 23 Drawing Sheets

(51) Int. Cl.
    *G06F 3/0484*     (2022.01)
    *G06F 3/04845*     (2022.01)
    *H04L 51/04*     (2022.01)
    *H04L 51/10*     (2022.01)

(52) U.S. Cl.
    CPC .............. *H04L 51/04* (2013.01); *H04L 51/10* (2013.01); *G06T 2200/24* (2013.01)

(56) References Cited

U.S. PATENT DOCUMENTS

| | | | |
|---|---|---|---|
| 2017/0206697 A1* | 7/2017 | McKenzie | G06T 13/205 |
| 2017/0336948 A1* | 11/2017 | Chaudhri | G06F 3/04817 |
| 2017/0359701 A1* | 12/2017 | Sarma | H04L 51/063 |
| 2018/0083898 A1* | 3/2018 | Pham | G06F 40/274 |
| 2018/0336543 A1* | 11/2018 | Van Os | G06Q 20/322 |

FOREIGN PATENT DOCUMENTS

| | | |
|---|---|---|
| CN | 104410561 A | 3/2015 |
| CN | 105468248 A | 4/2016 |
| CN | 106033337 A | 10/2016 |
| CN | 107479784 A | 12/2017 |
| WO | WO 2015167120 A1 | 11/2015 |
| WO | WO 2016007122 A1 | 1/2016 |

OTHER PUBLICATIONS

Tencent Technology, IPRP, PCT/CN2018/097923, dated Feb. 11, 2020, 6 pgs.

Tencent Technology, ISR, PCT/CN2018/097923, dated Sep. 27, 2018, 2 pgs.

* cited by examiner

STICKER PRESENTATION METHOD AND APPARATUS COMPUTER-READABLE STORAGE MEDIUM, AND TERMINAL

CROSS-REFERENCE TO RELATED APPLICATIONS

This application is a continuation application of PCT/CN2018/097923, entitled "STICKER PRESENTATION METHOD AND APPARATUS COMPUTER-READABLE STORAGE MEDIUM, AND TERMINAL" filed on Aug. 1, 2018, which claims priority to Chinese Patent Application No. 201710678570X, entitled "STICKER PRESENTATION METHOD AND APPARATUS, COMPUTER-READABLE STORAGE MEDIUM, AND TERMINAL" filed with the National Intellectual Property Administration, PRC on Aug. 10, 2017, both of which are incorporated by reference in their entirety.

FIELD OF THE TECHNOLOGY

This application relates to the field of Internet technologies, and in particular, to a sticker presentation method and apparatus, a computer-readable storage medium, and a terminal.

BACKGROUND OF THE DISCLOSURE

In the times of mobile Internet, depending on continuous development of social contact and networks, communication manners between people also correspondingly change, that is, change from communication through texts at the earliest time to starting gradually using some simple symbols and stickers, and then evolve into an increasingly diversified sticker culture step by step. In other words, stickers are a popular culture formed after social applications become active. For example, in a process in which a user interacts with a friend, to make two parties of interaction obtain good communication experience, this type of social application also supports a sticker presentation function. That is, any party participating in interaction may present a sticker to the opposite party of interaction on a message presentation interface.

In a related technology, a sticker is presented usually in the following manner: a terminal obtains a sticker selected by one party of interaction on a sticker selection window and presents the selected sticker according to an original presentation effect. For example, if the selected sticker is essentially a static picture, the terminal may correspondingly presents a static picture on a message presentation interface. Assuming that the selected sticker is a static smiley face, a static smiley face is presented on the message presentation interface.

In a process of implementing this application, the applicant finds that the related technology has at least the following problem:

When a sticker is presented, the terminal presents the sticker according to an original presentation effect of the sticker. Therefore, this sticker presentation manner lacks vividness, a manner is simple, and a display effect is poor.

SUMMARY

To resolve the problem in the related technology, embodiments of this application provide a sticker presentation method and apparatus, a computer-readable storage medium, and a terminal. The technical solutions are as follows:

According to a first aspect, a sticker presentation method is performed by a first terminal having one or more processors and memory storing a plurality of programs to be executed by the one or more processors, the method comprising:

detecting, by the first terminal, that a predefined quantity of a target sticker comprised in a sent target message of an instant messaging application satisfies an animation presentation condition;

determining, by the first terminal, a target animation presentation effect matching the target sticker after obtaining a message sending instruction, the target animation presentation effect indicating a presentation manner of at least one sticker element of the target sticker; and performing, by the first terminal, animation presentation on at least one sticker element of the target sticker in a message presentation interface of the instant messaging application according to the target animation presentation effect, content of the at least one sticker element being consistent with the target sticker.

According to a second aspect, a first terminal has one or more processors, memory coupled to the one or more processors and a plurality of programs stored in the memory that, when executed by the one or more processors, cause the mobile terminal to perform the aforementioned sticker presentation method.

According to a third aspect, a non-transitory computer readable storage medium stores a plurality of machine readable instructions in connection with a first terminal having one or more processors. The plurality of machine readable instructions, when executed by the one or more processors, cause the first terminal to perform the aforementioned sticker presentation method according to the first aspect.

The technical solutions provided in the embodiments of this application bring about the following beneficial effects:

When a sticker is presented, in addition to performing presentation according to an original presentation effect of the sticker, the terminal may further perform animation presentation on at least one sticker element of the target sticker on a message presentation interface according to an animation presentation effect matching the sticker when a quantity of stickers satisfies a condition for performing animation presentation. Therefore, this sticker presentation manner is more valid, various presentation patterns are provided, and a display effect is good.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Before the embodiments of this application are explained and described in detail, related terms in the embodiments of this application are explained.

Sticker: stickers are a popular culture formed after social applications become active and are used for expressing particular emotions, mainly thoughts and feelings in faces or postures. The stickers may be usually divided into symbol stickers, static picture stickers, animated stickers, and the like. For examples, stickers may use human faces expressing various emotions of humans as materials or use stars, quotations, comics and animation, movie screenshots, and the like that are currently popular as materials with a series of matching words added.

All In One (AIO): it is a message presentation interface provided in a social application, such as, a friend chat interface or a group chat interface, and is used for presenting stickers.

Linkage: an associated animation effect is triggered through a key/particular sticker.

Implementation scenarios and a system architecture related to the sticker presentation method according to an embodiment of this application are briefly described in the following.

The sticker presentation method according to this embodiment of this application is mainly used for a friend interactive scenario or a group interactive scenario. Currently, in an interaction scenario, assuming that a sticker selected by one party of interaction is a static smiley face, a static smiley face is presented on message presentation interfaces of two parties of interaction. Because this sticker presentation manner is excessively simple and lacks vividness, an interaction manner of triggering a linked animation effect through sending a certain quantity of stickers and presenting the animation effect on a message presentation interface is proposed in this embodiment of this application, so that a user can better express personal emotions with a friend in a friend relationship chain in an interaction process, enhancing emotion expression in an online non-face-to-face interaction situation, improving activity of the friend relationship chain, increasing interaction enjoyment, and providing better user experience.

Figure 1:
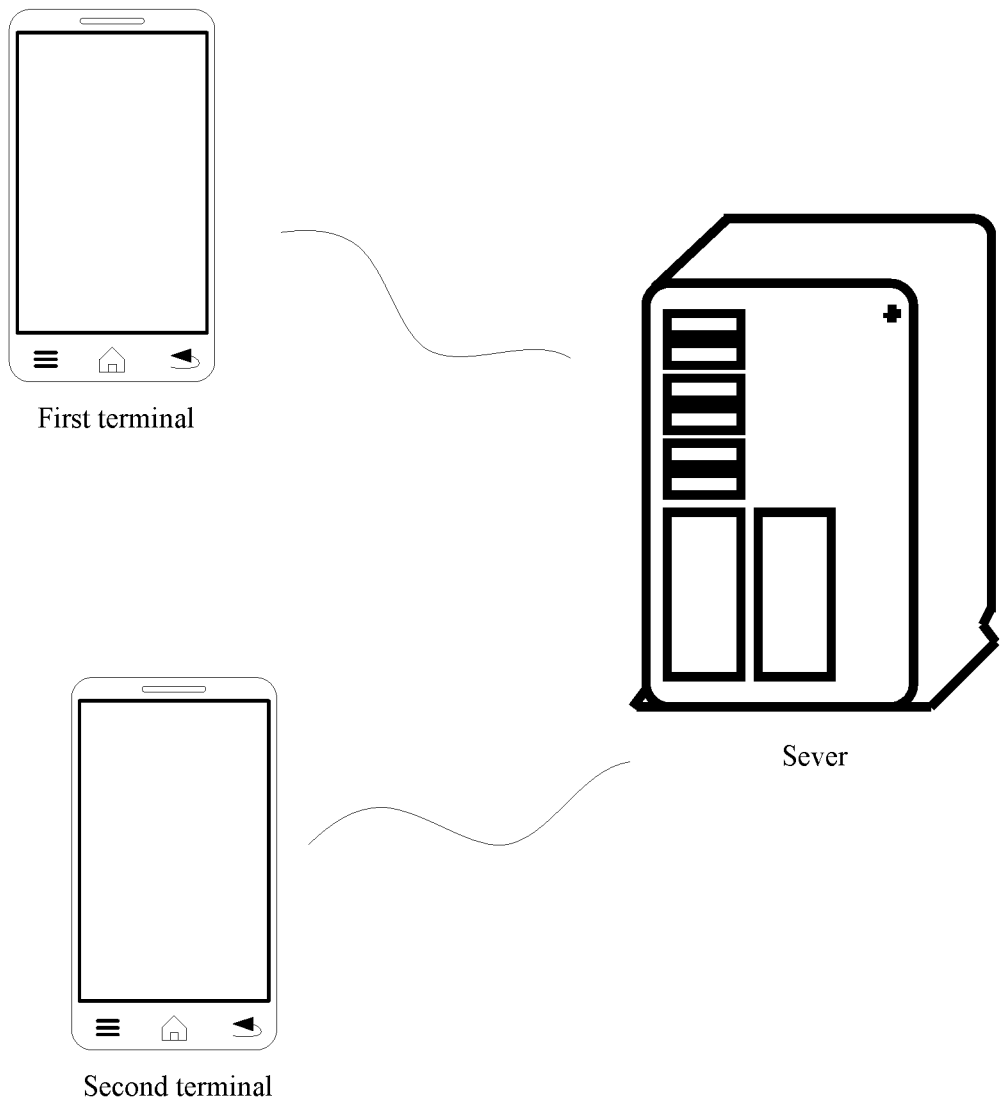
FIG. 1 is a diagram of a system architecture related to a sticker presentation method according to an embodiment of this application.

FIG. 1 is a diagram of a system architecture related to a sticker presentation method according to an embodiment of this application. Referring to FIG. 1, the system architecture includes a first terminal, a server, and a second terminal.

The first terminal and the second terminal may be smartphones, tablet computers, and the like. This is not specifically limited in this embodiment of this application. In a one-to-one interactive scenario, the second terminal includes one terminal. In a one-to-many interactive scenario, the second terminal includes a plurality of terminals. In addition, the same social application is installed on the first terminal and the second terminal. A first user of the first terminal and a second user of the second terminal perform interaction based on the social application. The first user refers to a message sending party in this embodiment of this application, and the second user refers to a message receiving party.

It should be noted that a sticker presentation process may be briefly described as the following two situations:

In a first situation, after a first terminal obtains a message sending instruction, on one hand, the first terminal sends a target message to a server, and on the other hand, the first terminal determines, according to a quantity of target stickers included in the target message, whether an animation presentation condition is satisfied. When a condition for performing animation presentation on the target sticker is satisfied, a target animation presentation effect matching the target sticker is further determined. Then the first terminal performs animation presentation on at least one sticker element of the target sticker on a message presentation interface according to the target animation presentation effect.

After receiving the target message sent by the first terminal, the server forwards the target message to a second terminal. After receiving the target message, the second terminal first determines, in a manner similar to that of the first terminal according to the quantity of target stickers included in the target message, whether the animation presentation condition is satisfied. When a condition for performing animation presentation on the target sticker is satisfied, the second terminal further determines the target animation presentation effect matching the target sticker and performs animation presentation on the at least one sticker element of the target sticker on a message presentation interface of the second terminal.

In summary, in the first situation, the server forwards only the target message sent by the first terminal, and the terminals determine whether the target message satisfies the animation presentation condition and determine the target animation presentation effect.

In a second situation, after obtaining the message sending instruction, the first terminal sends the target message to the server. After receiving the target message, the server determines, according to a quantity of target stickers included in the target message, whether the animation presentation condition is satisfied. When it is determined that a condition for performing animation presentation on the target sticker is satisfied, the server further determines the target animation presentation effect matching the target sticker. Then, the server separately sends response data to the first terminal and the second terminal. The response data includes at least the target animation presentation effect and the target sticker, so that the first terminal and the second terminal perform animation presentation on the at least one sticker element of the target sticker on respective message presentation interfaces according to the target animation presentation effect.

In summary, in the second situation, the server not only forwards the target message sent by the first terminal but also determines whether the target message satisfies the animation presentation condition and determines the target animation presentation effect, the terminals perform animation presentation on the at least one sticker element according to the target animation presentation effect determined by the server.

In this way, an interaction manner of triggering a linked animation effect through a certain quantity of stickers is achieved. In other words, in this embodiment of this application, a linked animation effect is triggered by clicking an input sticker and sending the sticker. It should be noted that content of the at least one sticker element being consistent with the target sticker. That is, thoughts and feelings expressed by the two are consistent. For example, if the target sticker is a smiley face of a smile degree, the sticker element is also a smiley face of a smile degree. The target animation presentation effect indicates a presentation manner of the at least one sticker element of the target sticker. There may be a plurality of presentation manners of the at least one sticker element. For example, the presentation manner may be used for describing a movement start location, a movement finish location, a moving track, size change information, transparency change information, animation presentation duration, and the like of the at least one sticker element. Alternatively, the presentation manner may be used for describing a presentation location, a scaling speed, transparency information, animation presentation duration, and the like of the at least one sticker element. Types of the presentation manner are not specifically limited in this embodiment of this disclosure. Refer to the following embodiments for more detailed explanations and descriptions for the sticker element and the target animation presentation effect.

Figure 2:
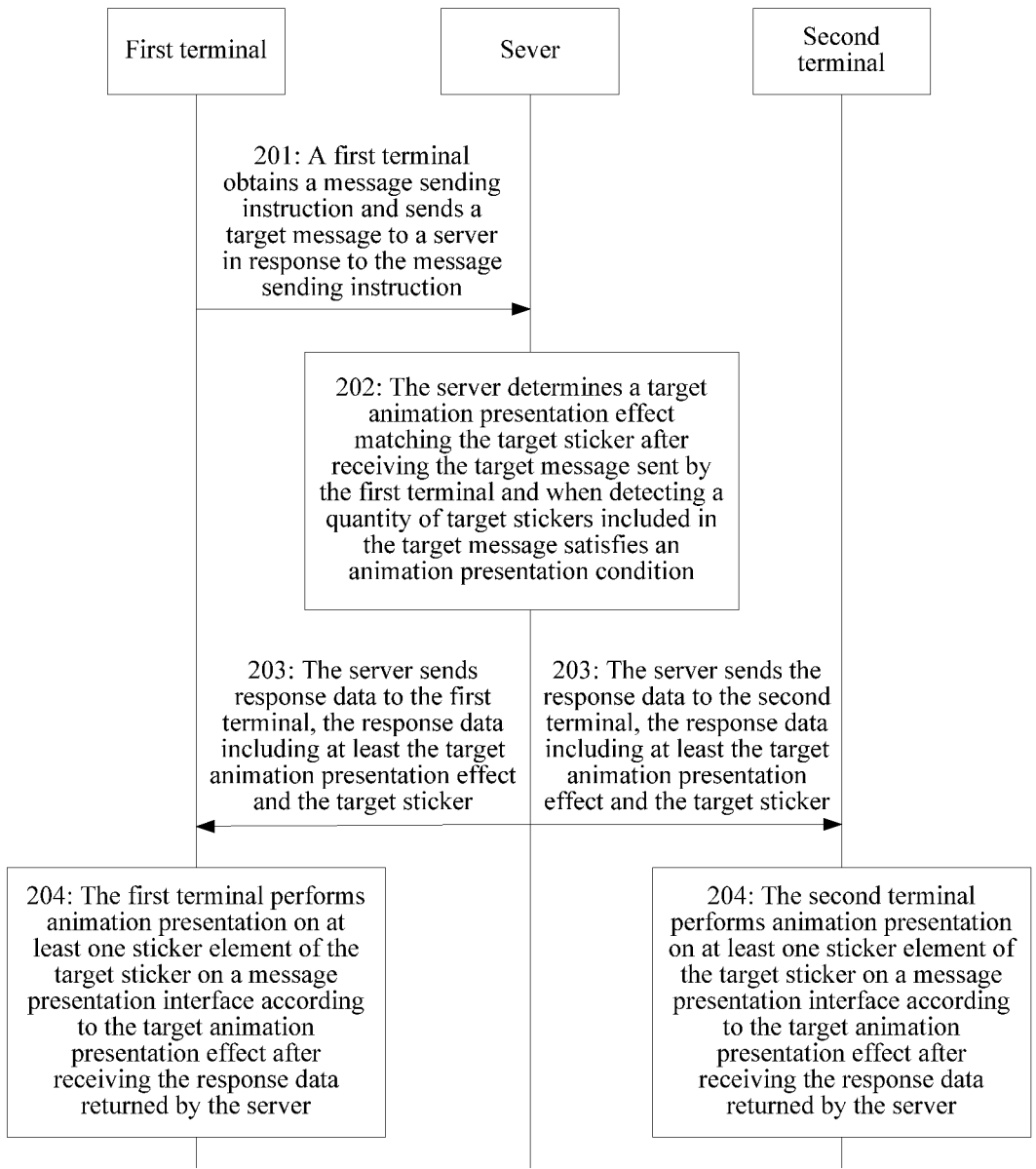
FIG. 2 is a flowchart of a sticker presentation method according to an embodiment of this application.

FIG. 2 is a flowchart of a sticker presentation method according to an embodiment of this application. Using the second situation as an example, referring to FIG. 2, a method process provided in this embodiment of this application includes:

201: A first terminal obtains a message sending instruction and sends a target message to a server in response to the message sending instruction.

Figure 3A:
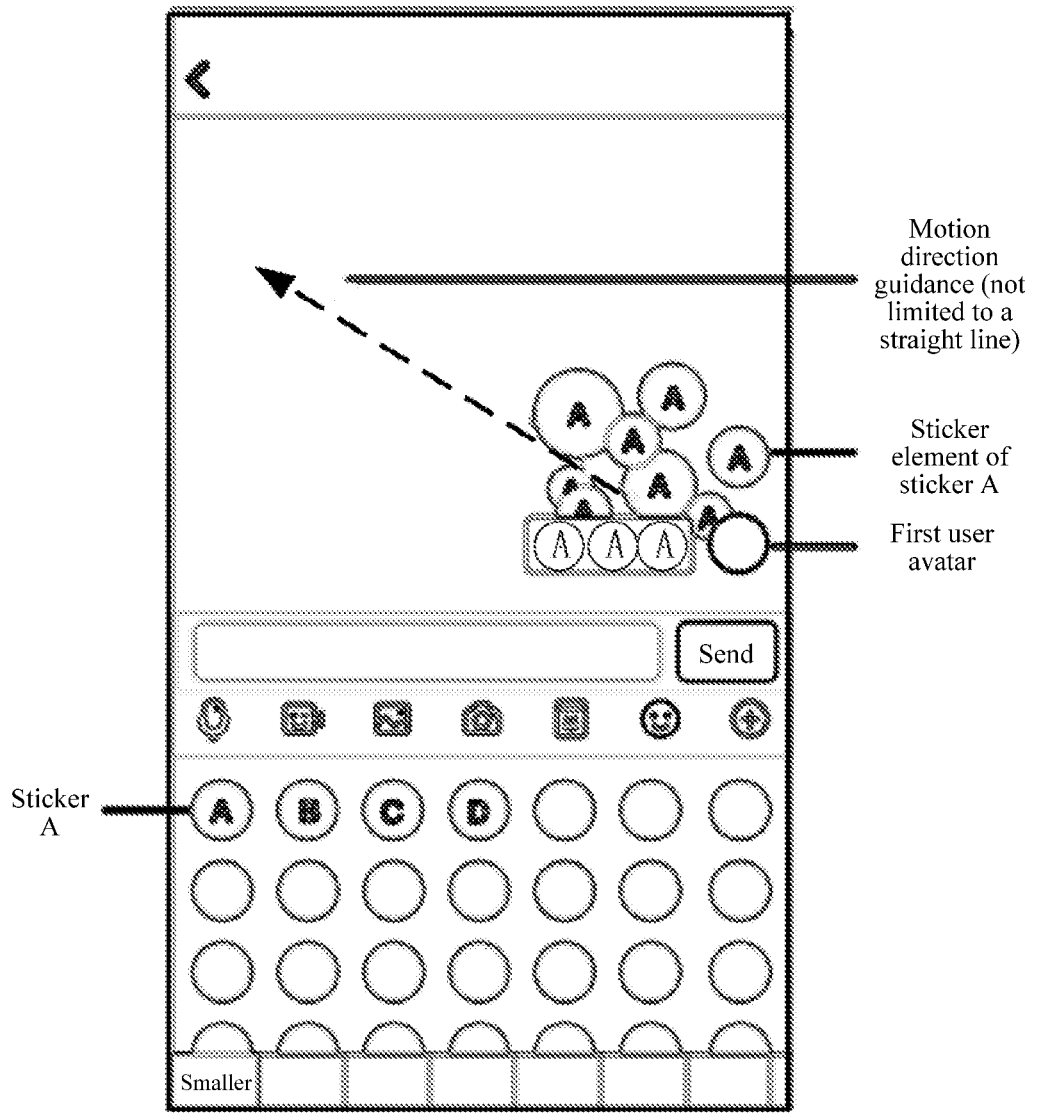
FIG. 3A is a schematic diagram of a message presentation interface according to an embodiment of this application.

In this embodiment of this application, when a first user triggers a send option shown in FIG. 3A, the first terminal obtains the message sending instruction, and further in response to the message sending instruction, uses content included in a current input box as a target message and sends the target message to the server.

It is well known to all that a text message as well as a sticker may be input in the current input box. For example, in FIG. 3A, the first terminal presents a sticker selection window in a lower portion area of the input box. A plurality of different stickers is shown in the sticker selection window. The first user may input the sticker by using a clicking and selection operation. For example, if the first user performs the clicking and selection operation for three times on a sticker A in the sticker selection window, three stickers A are displayed in the input box. In addition, the sticker selection window may present different stickers according to categories, so that the first user quickly searches the plurality of stickers for a desired sticker.

While sending the target message to the server, the first terminal may also present the target message on a local message presentation interface. It should be noted that in this embodiment of this application, regardless of whether the target message subsequently triggers the linked animation effect, the target message presented on the message presentation interface does not change at all. For example, the target message is three stickers A, the target message may be conventionally presented in a form of a message box body on the message presentation interface as shown in any of FIG. 3A to FIG. 3E. In other words, the linked animation effect is not triggered based on the target message in this embodiment of this application, and the stickers A in the target message are not changed. Using an example in which the target message is three static smiley faces, a presentation form of the target message is only three static smiley faces.

202: The server determines a target animation presentation effect matching the target sticker after receiving the target message sent by the first terminal and when detecting a quantity of target stickers included in the target message satisfies an animation presentation condition.

Because the generated target message is finally synchronously presented to a second user of the second terminal, the first terminal also needs to send the target message to the server, so that the server forwards the target message to the second terminal. In this embodiment of this application, in addition to that the server forwards the target message to the second terminal, particularly, the server may also perform the operation of determining whether to trigger a linked animation effect, specifically including:

First: The server determines whether the target message includes a target sticker.

The target sticker may be for all stickers currently stored in a social application of the first terminal or may be for some stickers currently stored in the social application. This is not specifically limited in this embodiment of this application. If the target sticker is for some stickers, which stickers a user automatically selects as the target sticker is also supported in this embodiment of this application.

Second: if the target message includes the target sticker, the server further determines whether the quantity of target stickers satisfies a condition for performing animation presentation.

There may be a plurality of manifestation forms for determining, according to the quantity of target stickers, whether the condition for performing animation presentation on the target sticker is satisfied.

a: When the quantity of target stickers is equal to a pre-specified preset threshold, the server determines that the condition for performing animation presentation on the target sticker is satisfied.

A value of the preset threshold is a positive integer and may be preset by the server. Assuming that the value of the preset threshold is 3, when the quantity of target stickers included in the target message is 3, the condition for performing animation presentation is determined, and linked animation presentation is separately performed on message presentation interfaces of the first terminal and the second terminal.

b: When the quantity of target stickers is equal to a pre-specified preset threshold, the server determines that the condition for performing animation presentation on the target sticker is satisfied.

In this situation, still using an example in which the value of the preset threshold is 3, it can be determined that the condition for performing animation presentation on the target sticker is satisfied provided that the quantity of target stickers included in the target message is not less than 3.

In addition, it should be noted that when the server determines whether the quantity of target stickers satisfies the condition for performing animation presentation, the target sticker may continuously appear and its quantity satisfies the preset threshold, or the target sticker appears at intervals and its quantity satisfies the preset threshold.

After determining that the condition for performing animation presentation on the target sticker is satisfied, the server continues to determine a target animation presentation effect matching the target sticker. In this embodiment of this application, to ensure diversity of the animation effect, different animation presentation effects are set for stickers belonging to different sticker types according to the different sticker types. That is, the server pre-stores a correspondence between the sticker types and the animation presentation effects. In this way, the target animation presentation effect matching the target sticker included in the target message may be determined in the following manner: obtaining a target sticker type to which the target sticker belongs; querying a correspondence between a preset sticker type and the animation presentation effect, and obtaining the animation presentation effect matching the target sticker type, to obtain the target animation presentation effect.

In this embodiment of this application, when classifying the stickers, the server may classify the stickers according to meanings represented by the stickers. For example, the stickers may be divided in the following categories: (1) an emotion type for representing an emotion, where the emotion type may be divided into a sticker of a positive emotion type such as funny or excited, or a sticker of a negative emotion type such as frustrated or painful; (2) a posture sticker for representing a posture action, which may include, for example, circling, running, and handshaking; (3) a language-category sticker for representing languages, which includes, for example, cursing and yelling; and (4) a special sticker, which may be a sticker of a category other than the foregoing three categories.

When setting the sticker type and the animation presentation effect, the server may set an animation presentation effect for each large category. For example, an animation presentation effect is separately for the four large categories. Alternatively, to finely present the linked animation effect, an animation presentation effect may be separately set for each divided small category. For example, using the category of the emotion type, an animation presentation effect may be separately set for each small category included in the category. In addition, the animation presentation effects of the categories may be the same or be different. This is not specifically limited in this embodiment of this application.

In another embodiment, stickers may be classified according to sources of the stickers. For example, the stickers are divided into application built-in stickers and additionally downloaded stickers. Alternatively, the stickers may be divided according to formats of the stickers. For example, the stickers are divided into static stickers and dynamic stickers. A classification manner of the stickers is not specifically limited in this embodiment of this application.

In another embodiment, after the correspondence between the sticker type and the animation presentation effect is set for the first time, the correspondence is subsequently updated is supported in this embodiment of this application. For example, an animation presentation effect is reset for each sticker type. Alternatively, animation presentation effects corresponding to the sticker types are exchanged. This is not specifically limited in this embodiment of this application.

203: The server separately sends response data to the first terminal and the second terminal, the response data including at least the target animation presentation effect and the target sticker.

In this embodiment of this application, after determining the target animation presentation effect matching the target sticker, the server further needs to notify the first terminal and the second terminal. To make the first terminal and the second terminal clear about which sticker the target animation presentation effect is for on earth, the response data sent by the server to the first terminal and the second terminal further includes the target sticker.

It should be noted that for ease of data transmission, identification information of the target animation presentation effect and the target sticker is actually transmitted by the server to the first terminal and the second terminal. Using the target sticker as an example, assuming that the target sticker is a smiley face, the response data may include only data /smile. /smile refers to the target sticker.

204: The first terminal and the second terminal perform animation presentation on at least one sticker element of the target sticker on a message presentation interface according to the target animation presentation effect after receiving the response data returned by the server.

In this embodiment of this application, after receiving the response data returned by the server, the first terminal and the second terminal generate the at least one sticker element of the target sticker. The sticker element is further explained and described in detail below with reference to FIG. 3A, and FIG. 3C to FIG. 3E.

As shown in FIG. 3A and FIG. 3C to FIG. 3E, three stickers A, that is, the target stickers, in a message box body are displayed on the message presentation interface, and at least one sticker element of the sticker A is displayed in other areas than the message box body. The at least one sticker element may dynamically presented on the message presentation interface. In addition, content expressed by the at least one sticker element is consistent with the target sticker, that is, thoughts and feelings expressed by the two are consistent. Using FIG. 3A, and FIG. 3C to FIG. 3E as an example, the at least one sticker element of the sticker A is a sticker A in a bubble form. In other words, assuming that the sticker A is a smiley face, the sticker element of the sticker A is a smiley face consistent with content of the sticker A, and an animation effect may be generated by linking smiley faces one by one.

It should be noted that only an example in which the sticker element is in a bubble form is used for description in FIG. 3A, and FIG. 3C to FIG. 3E. In addition, the sticker element may be in another form such as a snowflake and a raindrop and is not only limited to the bubble form. This is not specifically limited in this embodiment of this application. In another embodiment, several manners of performing animation presentation on at least one sticker element of the target sticker on the message presentation interface according to the target animation presentation effect are provided in this embodiment of this application, and details are as follows.

In a first manner, the at least one sticker element includes a plurality of sticker elements whose sizes are random.

In an exemplary implementation, when the animation effect is presented, the linked animation effect may be achieved according to a first presentation manner of the at least one sticker element indicated by the target animation presentation effect. The first presentation manner may be used for describing a movement start location, a movement finish location, a moving track, size change information, transparency change information, animation presentation duration, and the like of the at least one sticker element. Detailed steps are as follows:

A: The first terminal controls each sticker element in the at least one sticker element to move from a preset start location of the message presentation interface toward a preset finish location according to a preset moving track.

For stickers of different types, the preset start location and the preset finish location may be different. The preset moving track may be a straight line or may be a curved line, a wavy line, or the like. This is not specifically limited in this embodiment of this application.

B: The first terminal adjusts transparency and a size of each sticker element in a process of moving the sticker element.

C: The first terminal cancels presentation of each sticker element after first preset duration after the movement starts.

The presentation form of the animation effect is described below by using several specific examples.

Referring to FIG. 3A to FIG. 3E, the target sticker is the sticker A, the sticker A represents a sticker of a positive emotion such as funny and excited. Three continuous stickers trigger the linked animation effect. In addition, although a size of the at least one sticker element is random, the size is usually not less than a conventional size of the sticker A, that is, the sticker element at least has a size the same as the sticker A displayed in the target message.

Figure 3B:
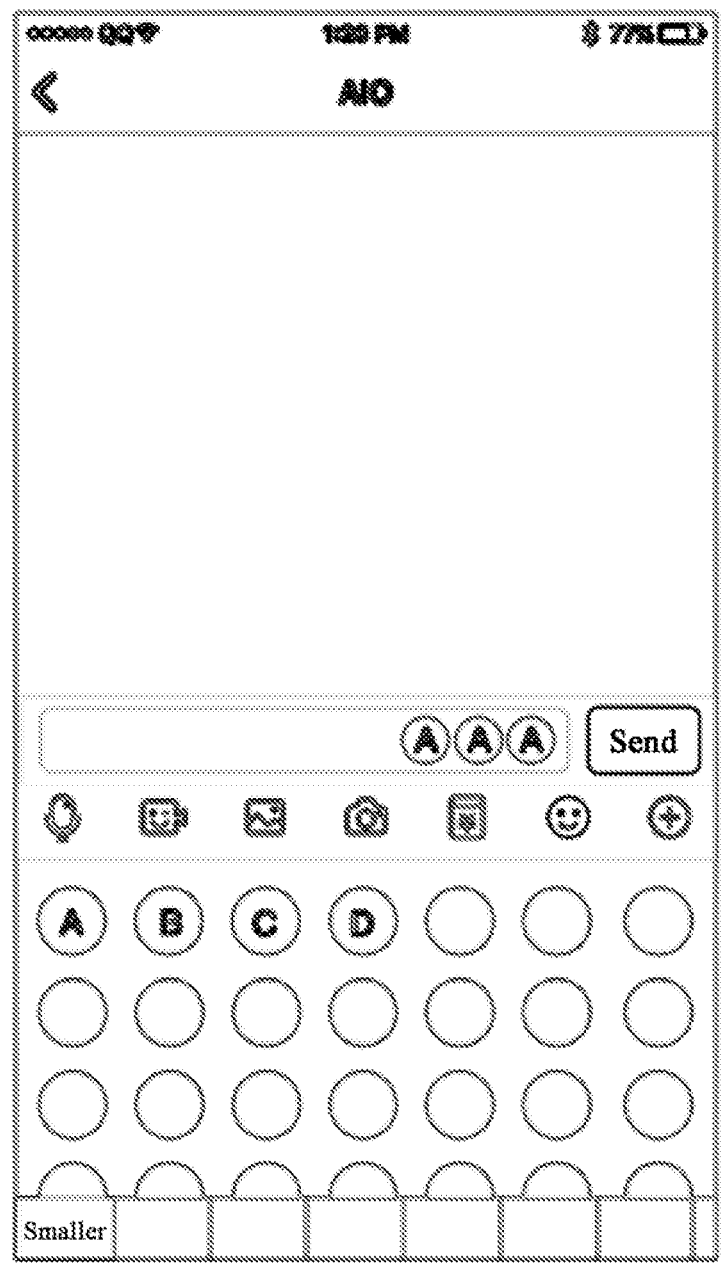
FIG. 3B is a schematic diagram of a message presentation interface according to an embodiment of this application.
Figure 3C:
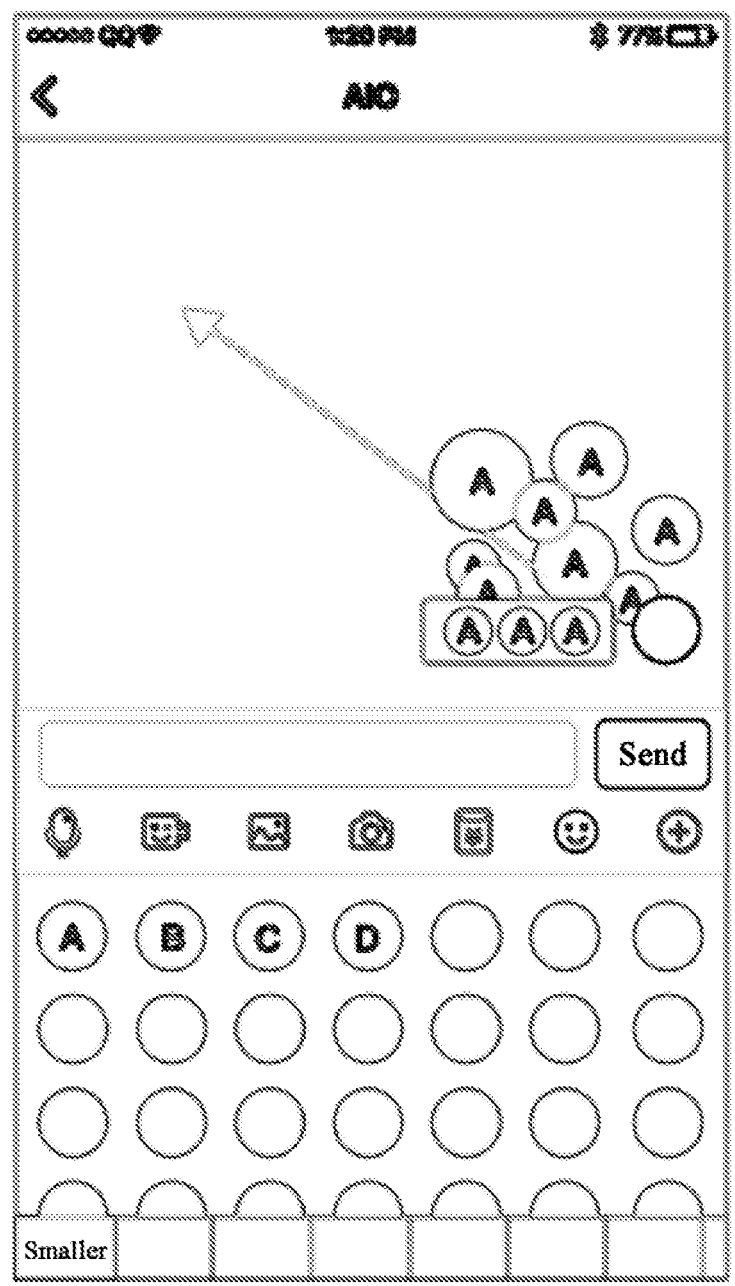
FIG. 3C is a schematic diagram of a message presentation interface according to an embodiment of this application.

In FIG. 3B, when the first user inputs three stickers A in the input box and clicks a send option, as shown in FIG. 3C, the first terminal uses an interface lower right corner of the message presentation interface as the preset start location and uses an upper left corner of a screen as the preset finish location and controls these sticker elements whose sizes are random to gradually move from the interface lower right corner toward the upper left corner. In a moving process, motion direction guidance may be marked on the message presentation interface shown in FIG. 3A and FIG. 3C.

Figure 3D:
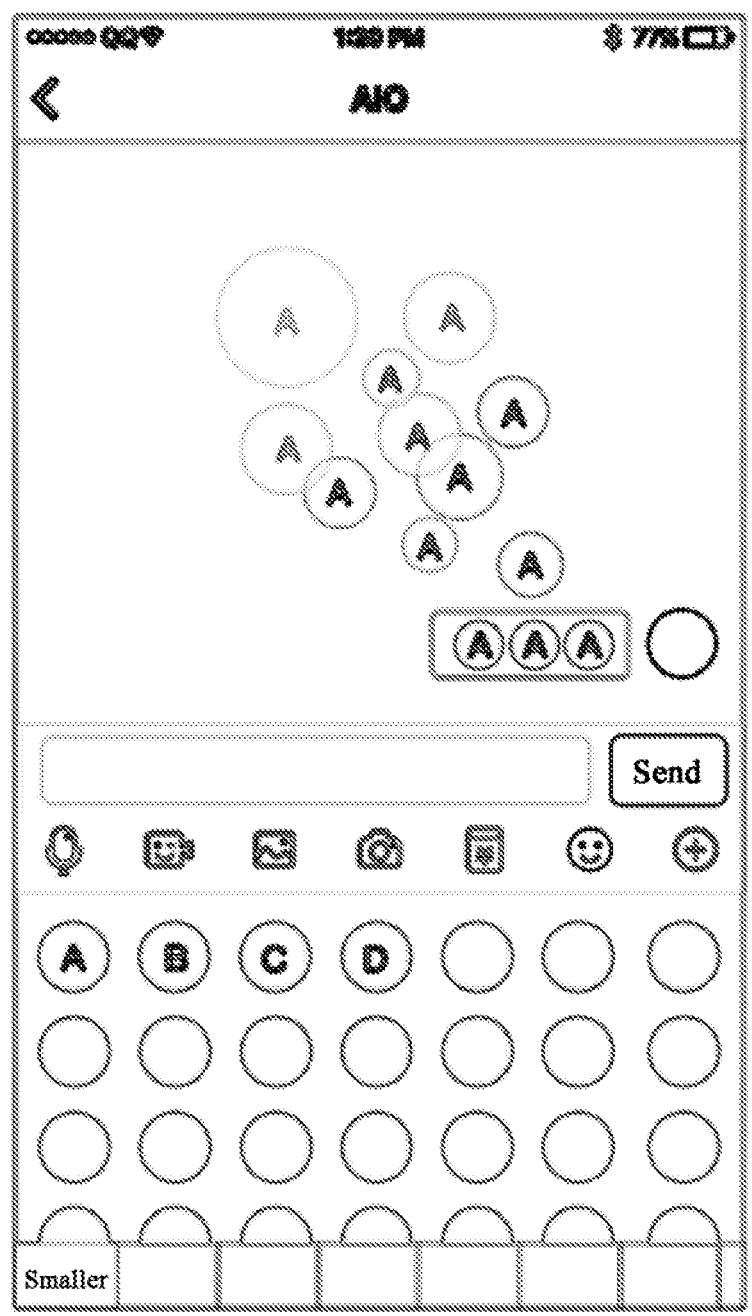
FIG. 3D is a schematic diagram of a message presentation interface according to an embodiment of this application.
Figure 3E:
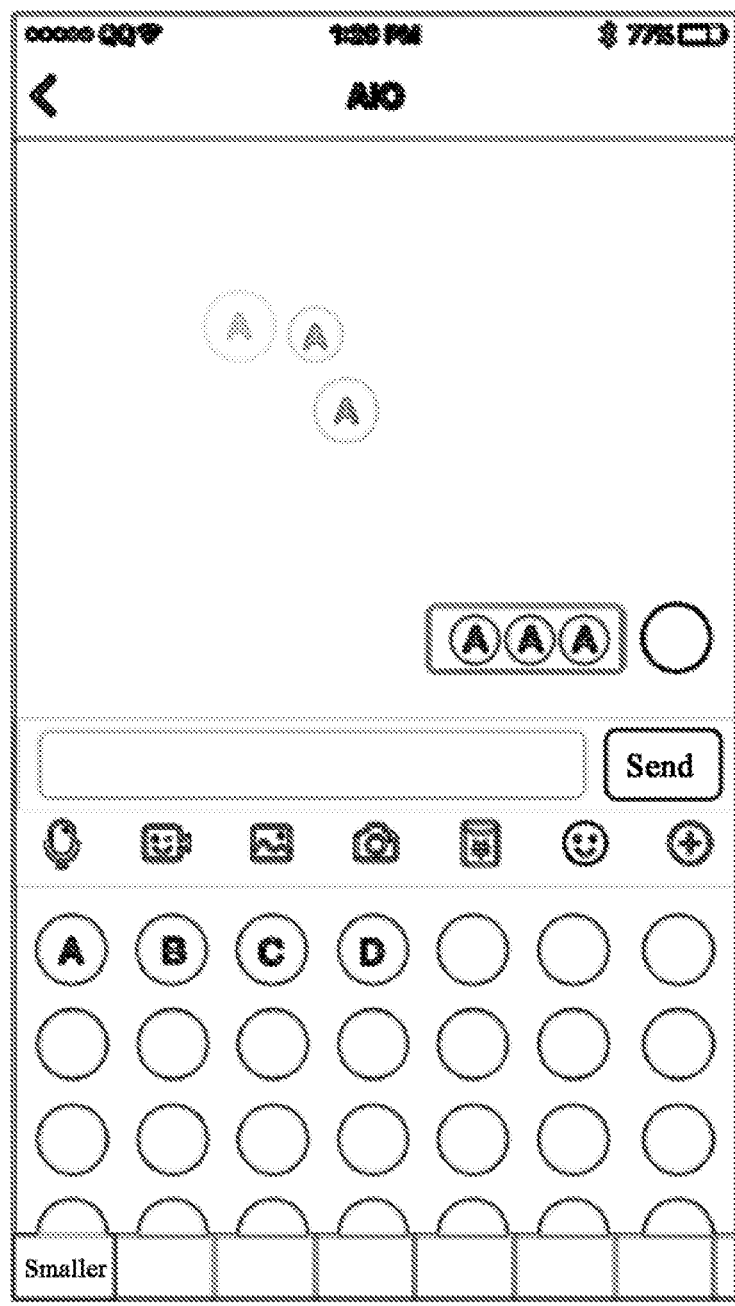
FIG. 3E is a schematic diagram of a message presentation interface according to an embodiment of this application.
Figure 3F:
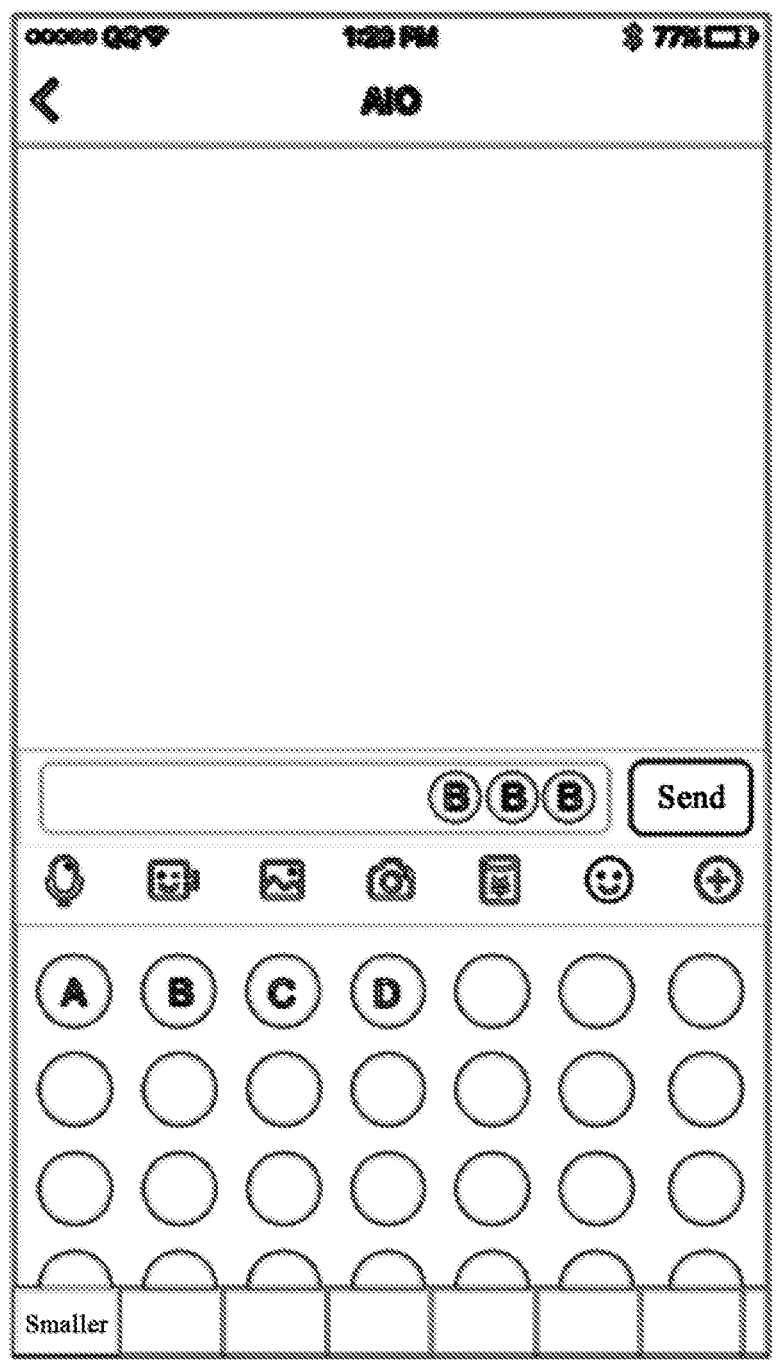
FIG. 3F is a schematic diagram of a message presentation interface according to an embodiment of this application.

As shown in FIG. 3C to FIG. 3E, the sticker elements may move to the left by 45 degrees during movement. The moving track may be in a wave form, a straight line form, a curved line form, and the like. A moving speed may be a uniform velocity or a variable velocity, and for example, the moving speed is gradually increased. This is not specifically limited in this embodiment of this application.

In addition, in a process of moving the at least one sticker element, the first terminal may also adjust the size and the transparency of the at least one sticker element. For example, each sticker element becomes larger or smaller, or a part of each sticker element becomes larger or smaller, or one part of each sticker element is magnified, and the other part is not processed. This is not specifically limited in this embodiment of this application. For example, the at least one sticker element is magnified in FIG. 3D. In addition, to enhance a presentation effect, by comparing FIG. 3C and FIG. 3D, transparency of each sticker element may also be lowered during movement, so that each sticker element is more transparent when closer to the preset finish location. When a sticker element is fully transparent, the sticker element completely disappears on the message presentation interface.

For different sticker elements, paces of gradually lowering the transparency may be consistent or may be inconsistent. This is not specifically limited in this embodiment of this application. Using an example in which transparency of each sticker element before initial movement is full non-transparency, when paces of lowering transparency of each sticker element are consistent, all sticker elements disappear on the message presentation interface at the same moment. For example, each sticker element disappears at the preset finish location at the same moment or on the way to the preset finish location.

When paces of lowering transparency of each sticker element are inconsistent, all the sticker elements disappear on the message presentation interface at different moments. As shown in FIG. 3E, because paces of lowering the transparency are inconsistent, some sticker elements disappear during movement.

It should be noted that presentation of each sticker element is canceled after first preset duration after movement starts. It can be known based on the description that canceling presentation of each sticker element herein includes two meanings. One meaning is: presentation of all the sticker elements is canceled at the same moment. For example, all the sticker elements disappear at a moment after the first preset duration arrives. The other meaning is: although presentation of at least one sticker element is not canceled at the same moment, but each sticker element disappears after the first preset duration.

The first preset duration may be 2 s, 3 s, or the like. That is, the animation effect lasts 2-3 s. The first terminal controls the lowering pace of the transparency and the movement speed, so that all the sticker elements disappear at a moment after the first preset duration.

In another embodiment, the at least one sticker element may gradually move from a lower left corner area toward an upper right corner area. This is not specifically limited in this embodiment of this application. In addition, in a process of moving the at least one sticker element, each sticker element may also make an animation effect. For example, each sticker element rotates clockwise or anticlockwise. That is, each sticker element gradually moves toward the preset finish location while rotation.

Figure 3G:
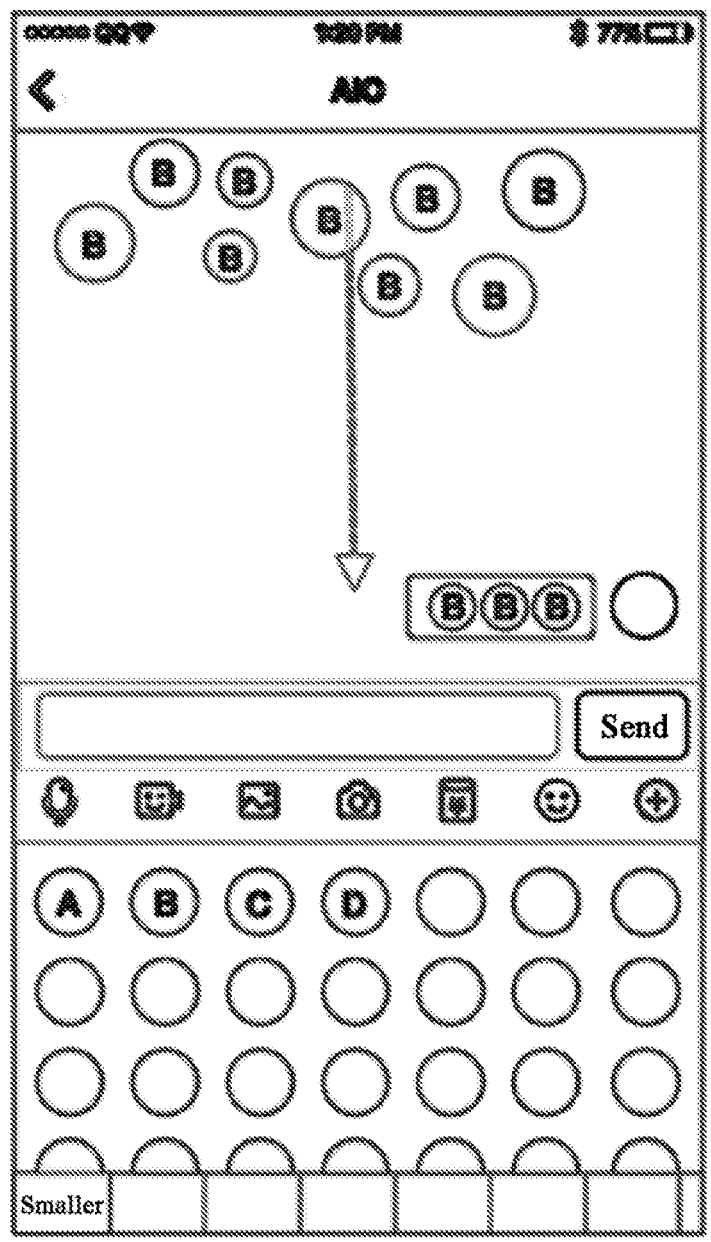
FIG. 3G is a schematic diagram of a message presentation interface according to an embodiment of this application.
Figure 3H:
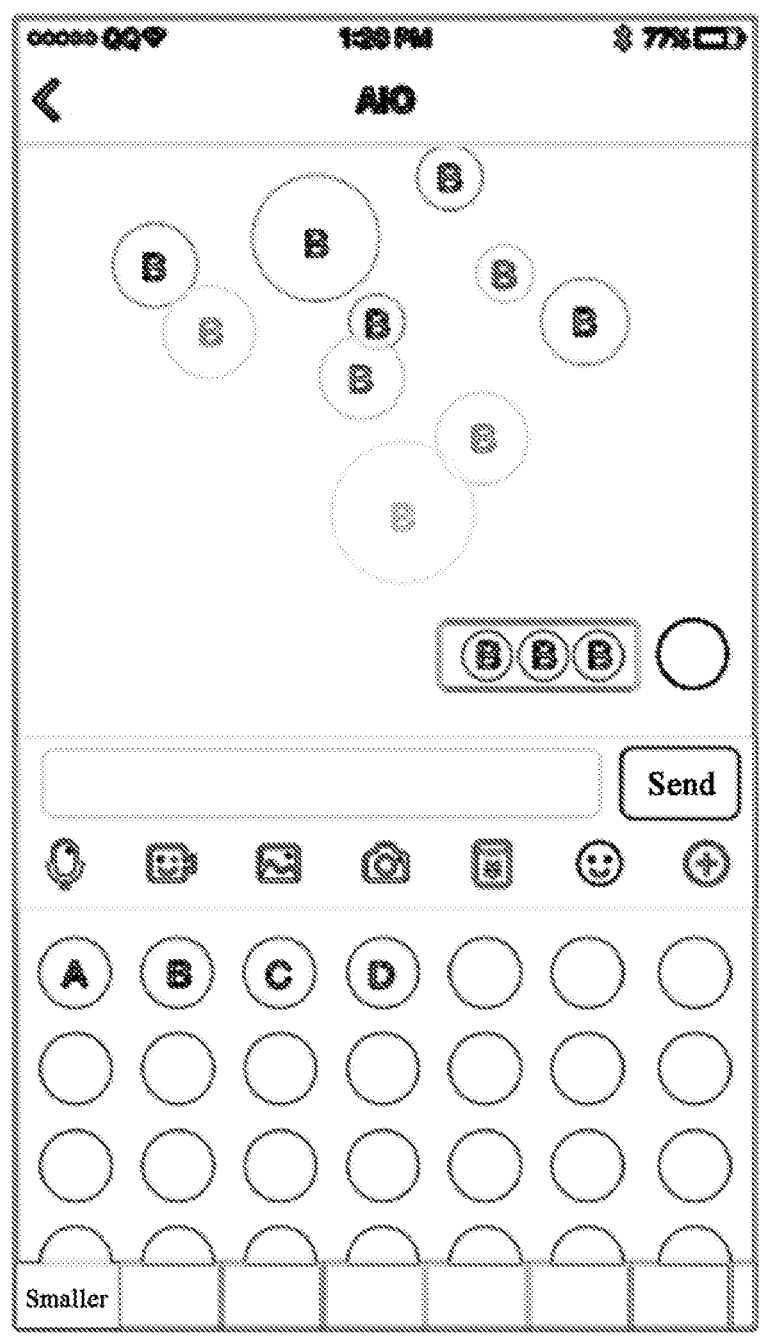
FIG. 3H is a schematic diagram of a message presentation interface according to an embodiment of this application.
Figure 3I:
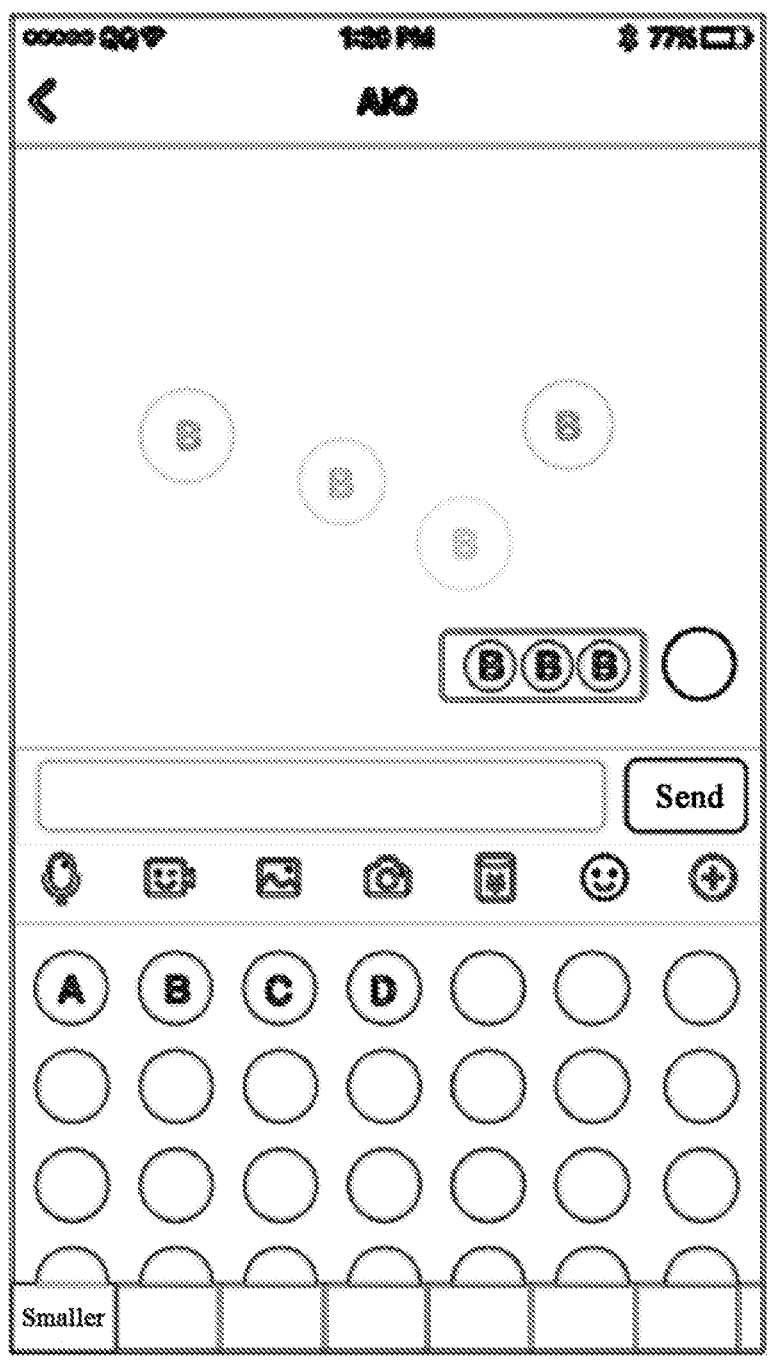
FIG. 3I is a schematic diagram of a message presentation interface according to an embodiment of this application.
Figure 3J:
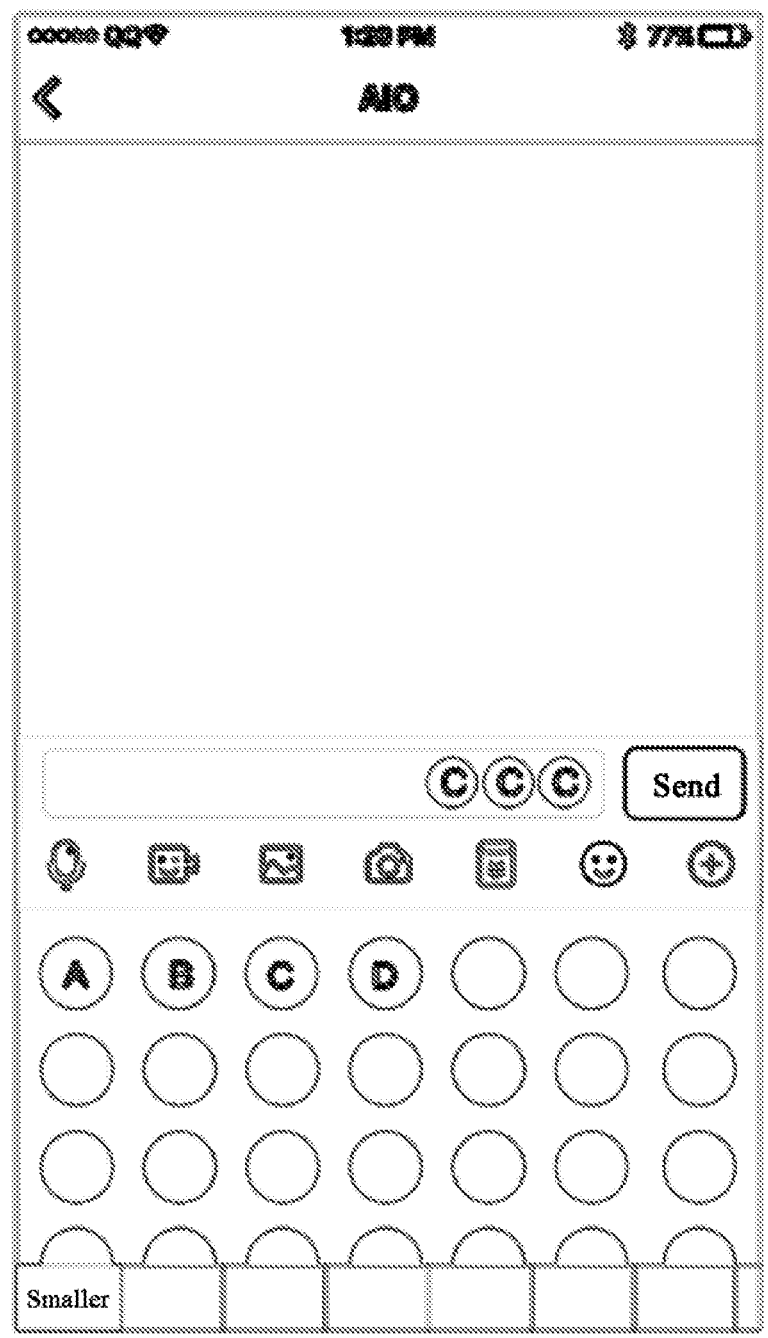
FIG. 3J is a schematic diagram of a message presentation interface according to an embodiment of this application.

Referring to FIG. 3F to FIG. 3I, the target sticker is used as a sticker B. The sticker B represents a sticker of a negative emotion such as frustrated and painful. Still using an example in which three continuous stickers trigger the linked animation effect, in FIG. 3F, after the first user inputs three stickers B in an input box and clicks a send option, as shown in FIG. 3G, the first terminal uses a location right above the message presentation interface as the preset start location and uses a location right below the message presentation interface as the preset finish location and controls these sticker elements whose sizes are random to gradually move from a location right above an interface toward a location right below the interface. In a moving process, motion direction guidance may be marked on the message presentation interface shown in FIG. 3G.

The moving track of the at least one sticker element of the sticker B may be in a wave form, a straight line form, a curved line form, and the like. A moving speed may be a uniform velocity or a variable velocity. In addition, in a process of moving the at least one sticker element of the sticker B, the size and the transparency of the at least one sticker element may also be adjusted. For example, each sticker element becomes larger or smaller, or a part of each sticker element becomes larger or smaller, or one part of each sticker element is magnified, and the other part is not processed. In addition, by comparing FIG. 3G and FIG. 3H, transparency of each sticker element may also be lowered during movement, so that each sticker element is more transparent when closer to the preset finish location.

For different sticker elements, paces of gradually lowering the transparency may be consistent or may be inconsistent. For the setting of the transparency, refer to descriptions for the at least one sticker element of the sticker A. Details are not described herein. In addition, presentation of each sticker element of the sticker B is canceled after first preset duration after movement starts. For the manner of canceling presentation, refer to descriptions for the at least one sticker element of the sticker A. Details are not described herein.

In another embodiment, the at least one sticker element of the sticker B may gradually move from a location right below the message presentation interface toward a location right above the message presentation interface. This is not specifically limited in this embodiment of this application. In addition, in a process of moving the at least one sticker element of the sticker B, each sticker element may also make an animation effect. For example, each sticker element rotates clockwise or anticlockwise. That is, each sticker element gradually moves toward the preset finish location while rotation.

Figure 3K:
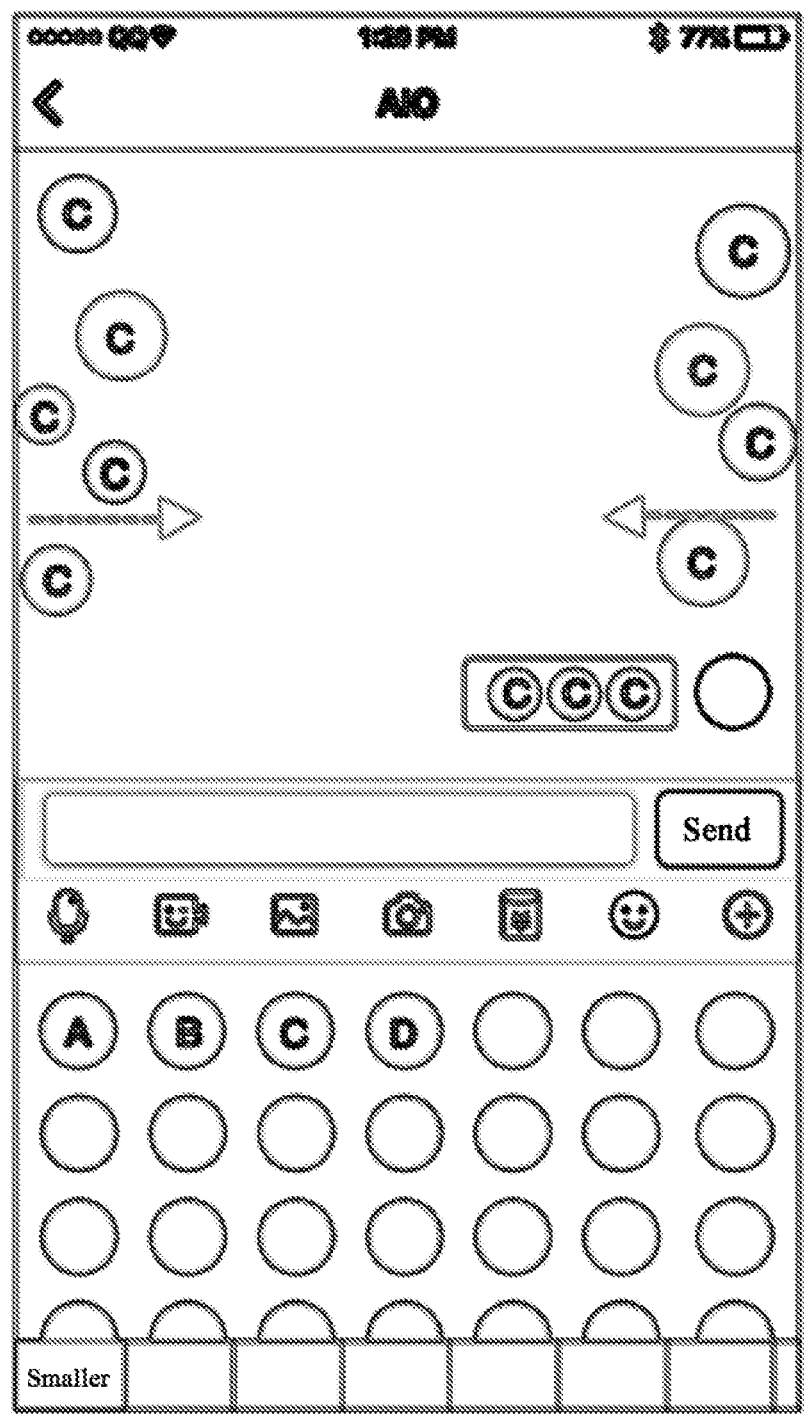
FIG. 3K is a schematic diagram of a message presentation interface according to an embodiment of this application.
Figure 3L:
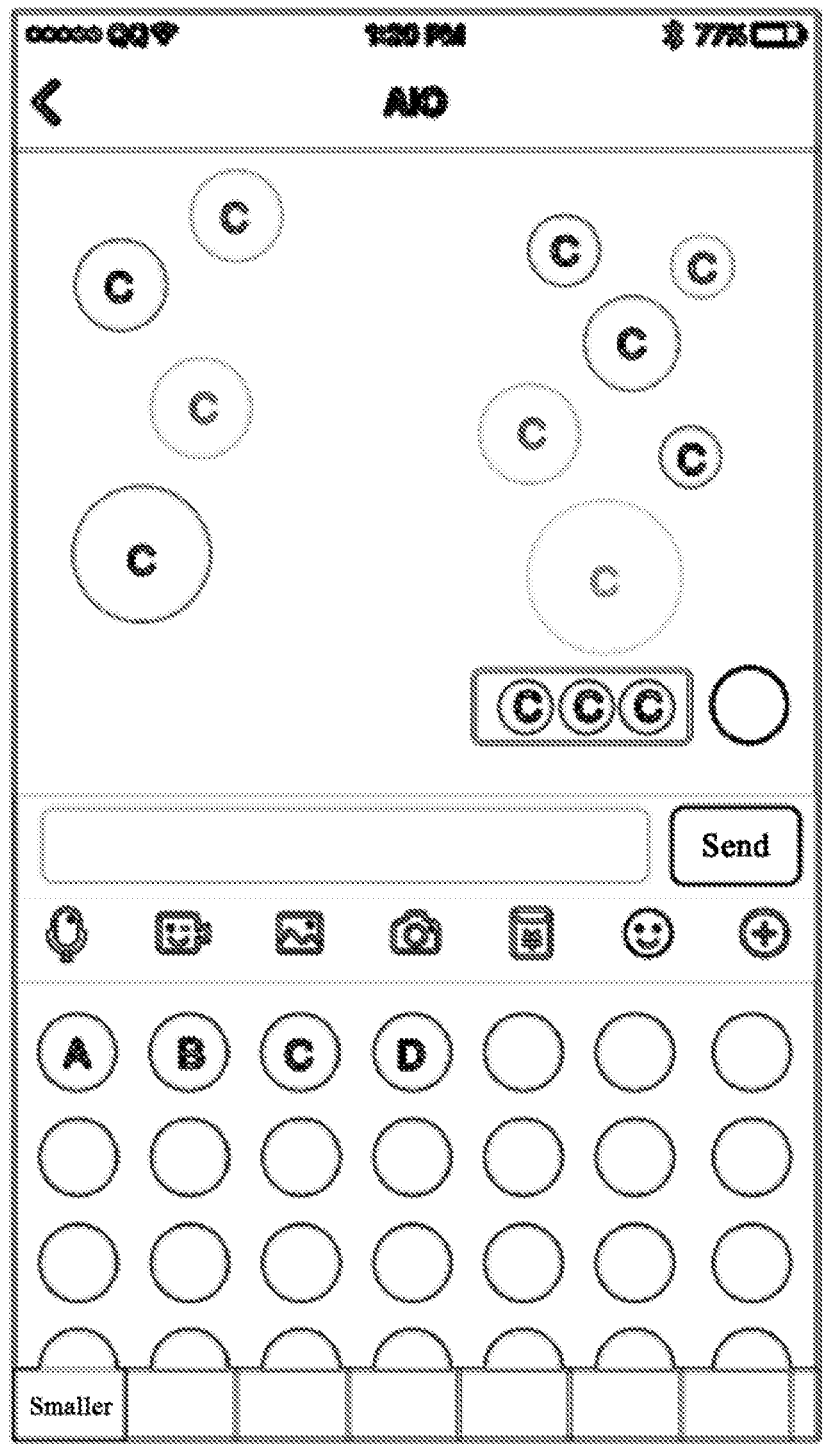
FIG. 3L is a schematic diagram of a message presentation interface according to an embodiment of this application.
Figure 3M:
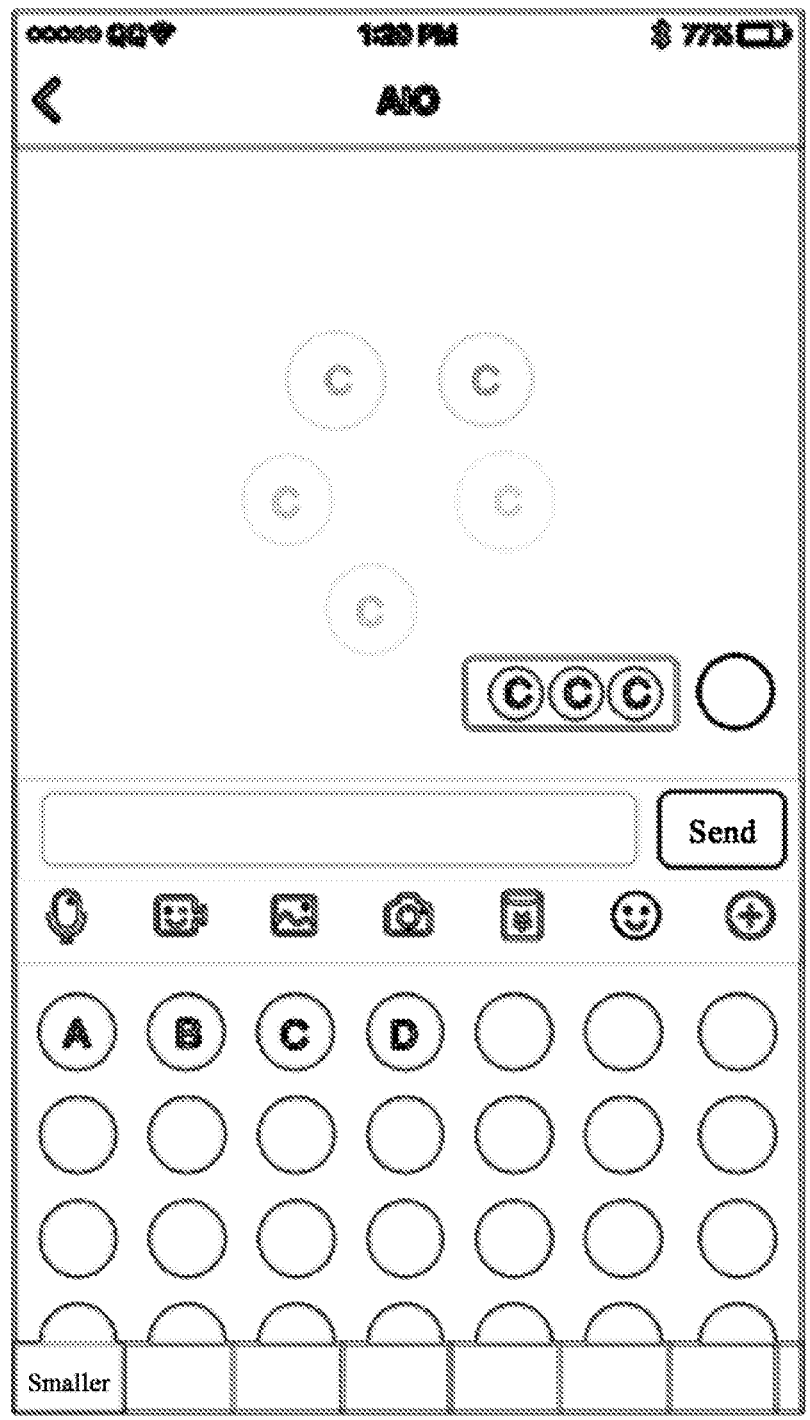
FIG. 3M is a schematic diagram of a message presentation interface according to an embodiment of this application.

Referring to FIG. 3J to FIG. 3M, the target sticker is used as a sticker C. The sticker C represents a sticker of a language-category emotion such as cursing and yelling. Still using an example in which three continuous stickers trigger the linked animation effect, in FIG. 3J, after the first user inputs three stickers C in an input box and clicks a send option, as shown in FIG. 3K, a left side location and a right side location of the message presentation interface are used as the preset start location, and a longitudinal central axis is used as the preset finish location, and these sticker elements whose sizes are random are controlled to gradually move a left side and a right side toward the central axis. In a moving process, motion direction guidance may be marked on the message presentation interface shown in FIG. 3K. In addition, quantities of sticker elements appearing on the left side and the right side may be the same or may be different, or a quantity difference is within a certain quantity range. This is not specifically limited in this embodiment of this application.

The moving track of the at least one sticker element of the sticker C may be in a wave form, a straight line form, a curved line form, and the like. A moving speed may be a uniform velocity or a variable velocity. In addition, in a process of moving the at least one sticker element of the sticker C, the first terminal may also adjust the size and the transparency of the at least one sticker element. For example, each sticker element becomes larger or smaller, or a part of each sticker element becomes larger or smaller, or one part of each sticker element is magnified, and the other part is not processed. In addition, by comparing FIG. 3K and FIG. 3L, transparency of each sticker element may also be lowered during movement, so that each sticker element is more transparent when closer to the preset finish location.

For different sticker elements, paces of gradually lowering the transparency may be consistent or may be inconsistent. For the setting of the transparency, refer to descriptions for the at least one sticker element of the sticker A. Details are not described herein. In addition, presentation of each sticker element of the sticker C is canceled after first preset duration after movement starts. For the manner of canceling presentation, refer to descriptions for the at least one sticker element of the sticker A. Details are not described herein.

In another embodiment, the at least one sticker element of the sticker C may all gradually move from a left side location of the message presentation interface toward a right side location, or all gradually move from a right side location of the message presentation interface toward a left side location, or separately move toward a left side location and a right side location from the central axis. This is not specifically limited in this embodiment of this application. In addition, in a process of moving the at least one sticker element of the sticker C, each sticker element may also make an animation effect. For example, each sticker element rotates clockwise or anticlockwise. That is, each sticker element gradually moves toward the preset finish location while rotation.

In a second manner, the at least one sticker element includes a sticker element whose size is fixed.

In an exemplary implementation, when the animation effect is presented, the first terminal may achieve the linked animation effect according to a second presentation manner of the at least one sticker element indicated by the target animation presentation effect. The second presentation manner is used for describing a presentation location, a scaling speed, transparency information, animation presentation duration, and the like of the sticker element. Detailed steps are as follows:

A: The first terminal presents the sticker element on the message presentation interface and magnifies the sticker element according to the preset speed until the magnified sticker element has a size of the message presentation interface.

Figure 3N:
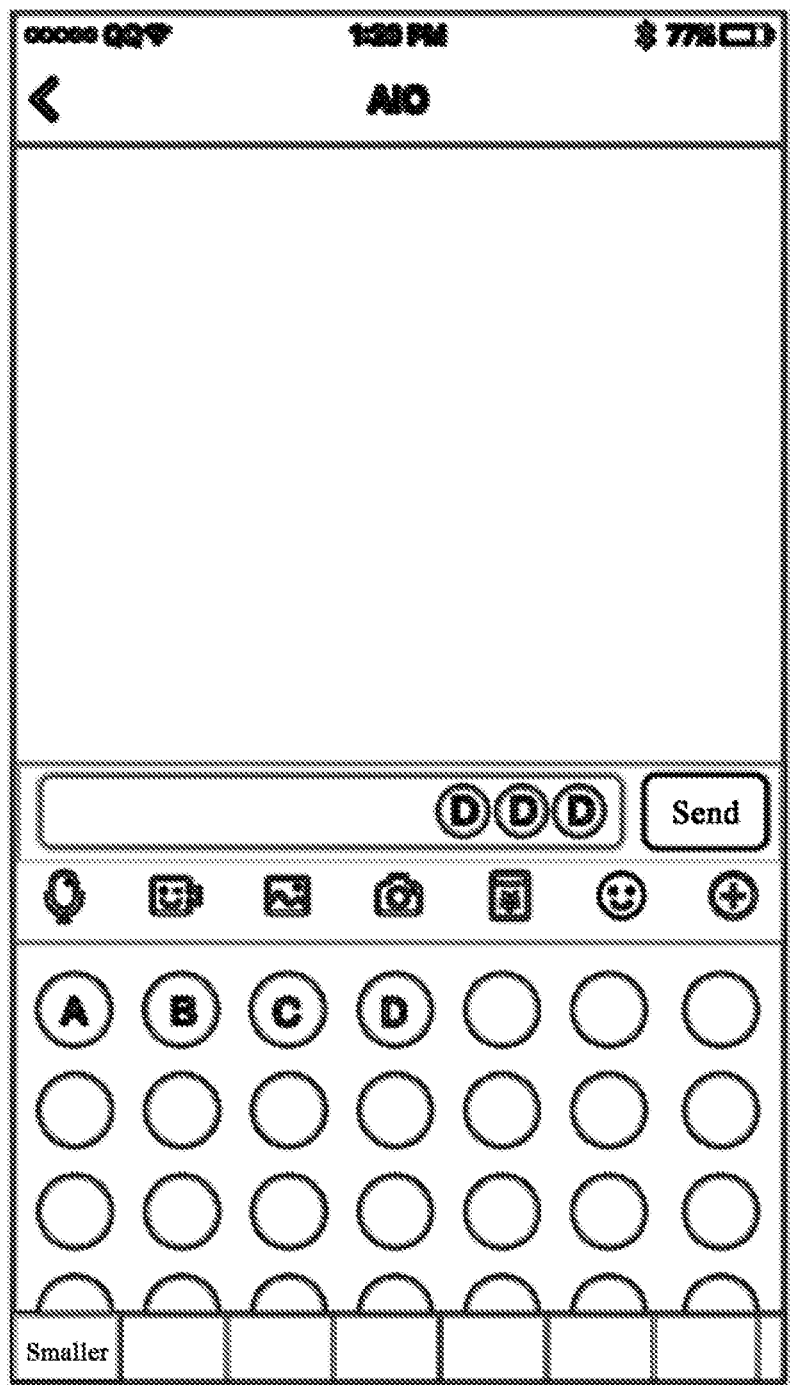
FIG. 3N is a schematic diagram of a message presentation interface according to an embodiment of this application.
Figure 3O:
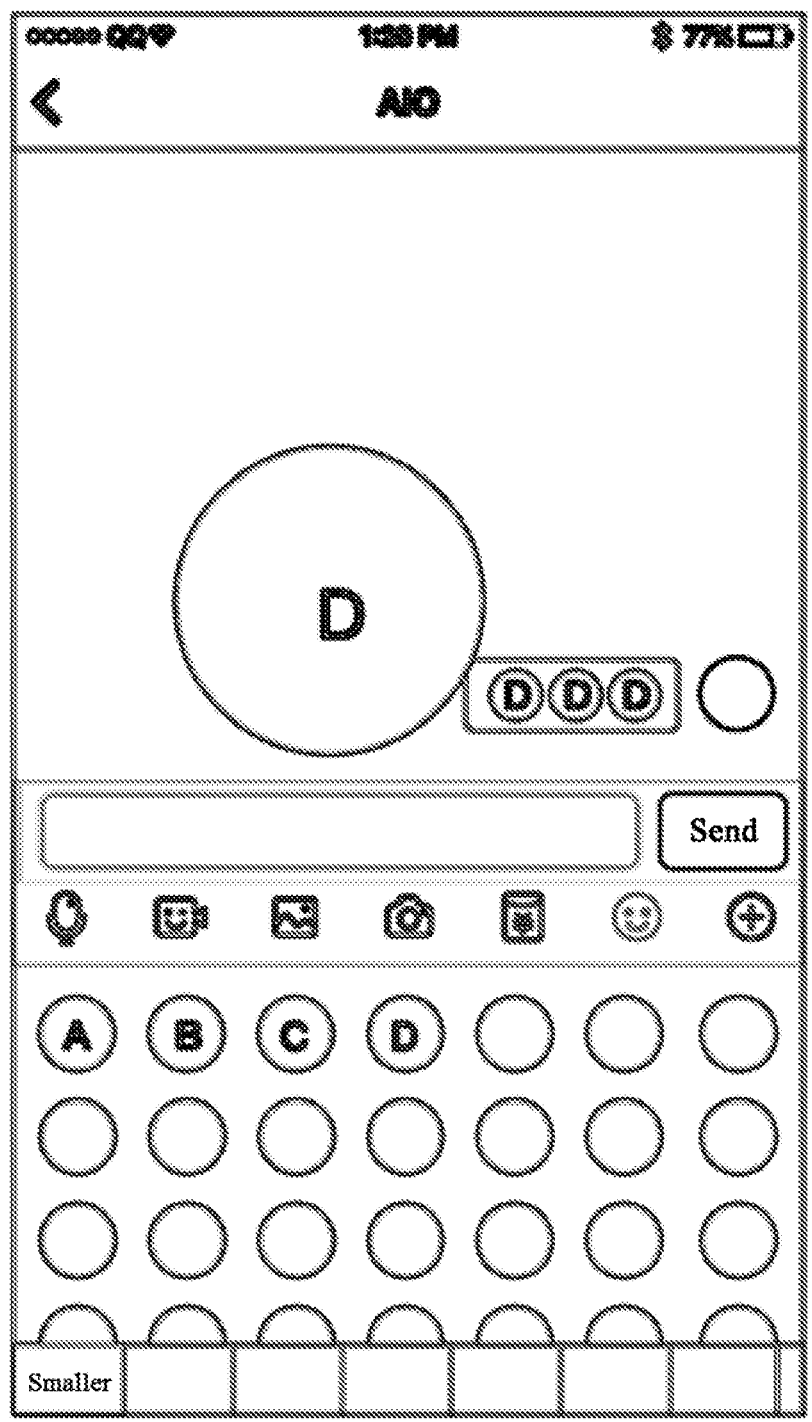
FIG. 3O is a schematic diagram of a message presentation interface according to an embodiment of this application.
Figure 3P:
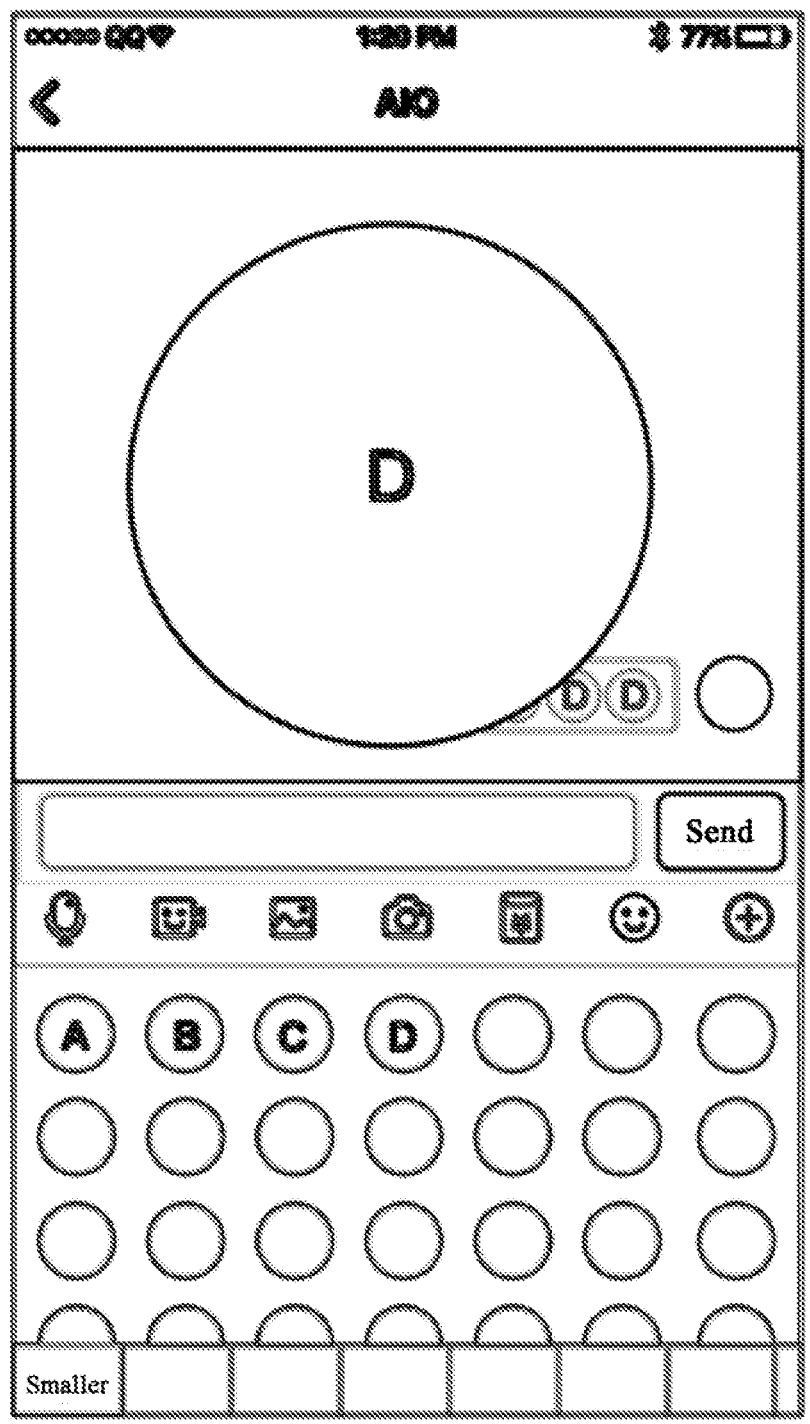
FIG. 3P is a schematic diagram of a message presentation interface according to an embodiment of this application.

Referring to FIG. 3N to FIG. 3P, the target sticker is used as a sticker D. The sticker B represents a sticker of other special emotions than the foregoing types of emotions. Still using an example in which three continuous stickers trigger the linked animation effect, in FIG. 3N, after the first user inputs three stickers D in an input box and clicks a send option, as shown in FIG. 3O, a sticker element of the sticker D is presented at a preset location of the message presentation interface. A size of the sticker element is not greatly different from an original size of the sticker D. In the following, by comparing FIG. 3O and FIG. 3P, the first terminal may magnify the sticker element until the magnified sticker element has a size of the whole message presentation interface. If the sticker D is an animated sticker, a corresponding animation is synchronously presented in a magnification process, or a corresponding action and text language are synchronously presented.

B: The first terminal adjusts the transparency of the sticker element in a magnification process, and cancels presentation of the magnified sticker element after second preset duration after the magnification starts.

The second preset duration may be the same as the first preset duration or may be different from the first preset duration. This is not specifically limited in this embodiment of this application. There is usually the following plurality of several manifestation forms for the step.

In a first form, the first terminal adjusts the transparency at a moment at which magnification starts. Assuming that initial transparency of the sticker element is full non-transparency, the transparency of the sticker element may be gradually lowered in a magnification process, that is, the sticker element is more transparent if being further magnified. When the magnified sticker element has a size of the message presentation interface, the second preset duration synchronously arrives, and the sticker element synchronously becomes fully transparent.

In a second form, the first terminal adjusts the transparency at a moment at which magnification starts. Assuming that initial transparency of the sticker element is partial transparency, the transparency of the sticker element may be gradually improved in the magnification process, that is, the sticker element is less transparent when being further magnified. When the magnified sticker element has the size of the message presentation interface, the sticker element becomes fully non-transparent. In the following, the transparency of the sticker element is gradually lowered. When the second preset duration is arrived, the sticker element becomes fully transparent.

In a third manner, the first terminal adjusts the transparency after the sticker element is magnified to have the size of the message presentation interface.

Assuming that initial transparency of the sticker element is full non-transparency, after the sticker element is magnified to have the size of the message presentation interface, the transparency of the sticker element is adjusted, and the transparency of the sticker element is gradually lowered. When the second preset duration is arrived, the sticker element becomes fully transparent.

Figure 4:
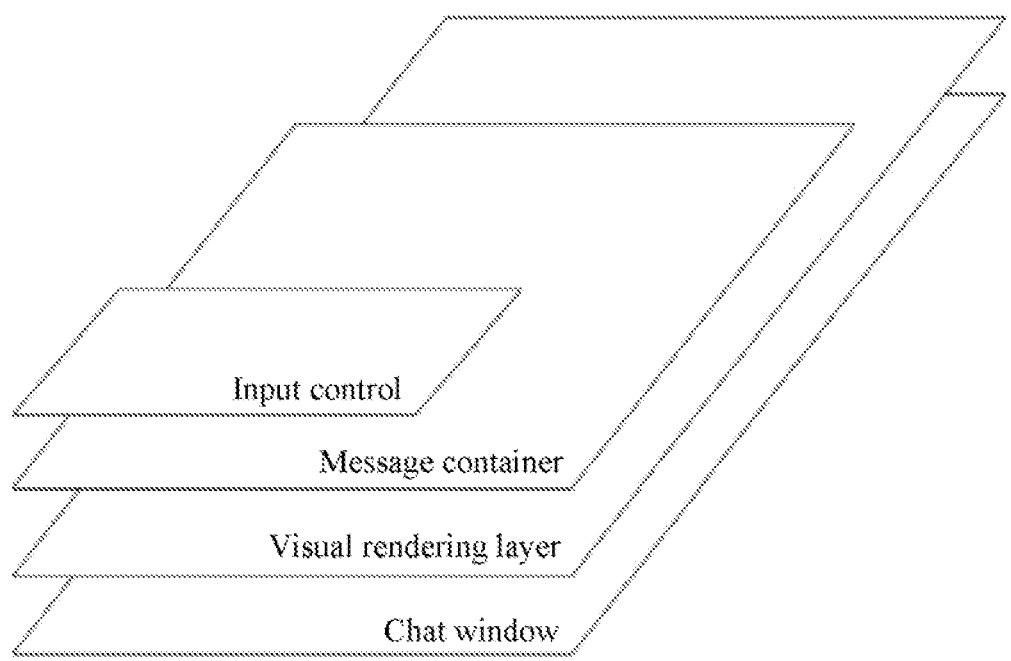
FIG. 4 is a structural diagram of a message presentation interface according to an embodiment of this application.

In conclusion, specific manifestation forms of several animation presentation effects are listed in this embodiment of this application. The linked animation effect for the target sticker can be achieved in this embodiment of this application because a visual rendering layer of the message presentation interface is redrawn. Referring to FIG. 4, the group session interface includes the visual render layer, a message container disposed on the visual render layer, and an input control disposed on the message container.

The message container is a layer for accommodating a message generated in an interaction process of the first user and the second user. The message container may be rectangular, round, or of an irregular shape. An area for presenting the message in the message container may be non-transparent, and an area other than the area for presenting the message in the message container may be transparent or semi-transparent. This is not specifically limited in this embodiment of this application. The input control is a control for input and may include an input box. In this embodiment of this application, the visual rendering layer is redrawn, so that a dynamic sticker animation can be presented when a sticker is input. After the visual rendering layer is provided, the first terminal specifically draws content by calling a user interface (UI) component by using a method for drawing a rendering object, that is, draws, according to the target animation presentation effect, the at least one sticker element of the target sticker on the visual rendering layer by calling the UI component, to perform animation presentation on the at least one sticker element of the target sticker on the message presentation interface.

In another embodiment, when a generated message is presented, the message is specifically presented in the message container in this embodiment of this application, while a dynamic presentation effect of the target sticker is presented through the visual rendering layer, so that presentation of the message is separated from presentation of the dynamic presentation effect, achieving a better presentation effect.

Figure 5:
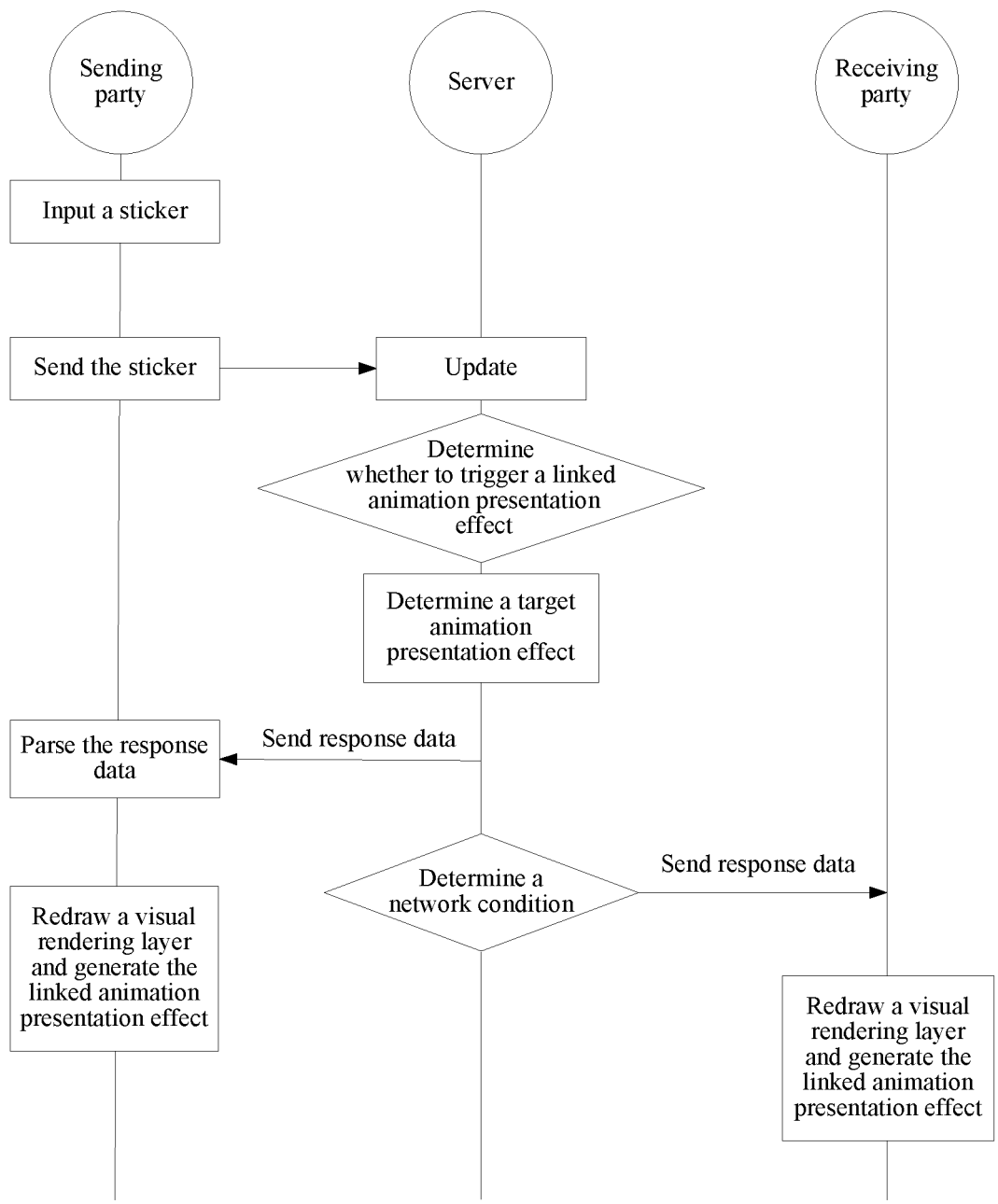
FIG. 5 is an overall flowchart of a sticker presentation method according to an embodiment of this application.

In conclusion, referring to FIG. 5, a whole process of the sticker presentation method provided in this embodiment of this application includes:

A) A sending party inputs a target sticker and sends the target sticker to a server.

B) The server updates a status after receiving the target sticker, to record that the current sending party sends a message.

C) The server determines, for the target sticker, whether a condition for triggering a linked animation presentation effect is satisfied.

D) The server determines a target animation presentation effect when determining that the condition for triggering the animation presentation effect is satisfied, and returns response data including the target animation presentation effect to the sending party.

E) The sending party parses the response data to obtain the target animation presentation effect.

F) The sending party redraws the visual rendering layer according to the target animation presentation effect, to perform linked animation presentation on the target sticker.

G) The server determines a network status of a receiving party, and when a network of the receiving party is in a connected state, sends the response data including the target animation presentation effect to the receiving party.

H) The receiving party parses the response data to obtain the target animation presentation effect.

I) The receiving party redraws the visual rendering layer according to the target animation presentation effect, to perform linked animation presentation on the target sticker.

In the method provided in this embodiment of this application, when a sticker is presented, in addition to performing presentation according to an original presentation effect of the sticker, the terminal may further perform animation presentation on at least one sticker element of the target sticker on a message presentation interface according to an animation presentation effect matching the sticker when a quantity of stickers satisfies a condition for performing animation presentation. Therefore, this sticker presentation manner is more valid, various presentation patterns are provided, and a display effect is good.

Figure 6:
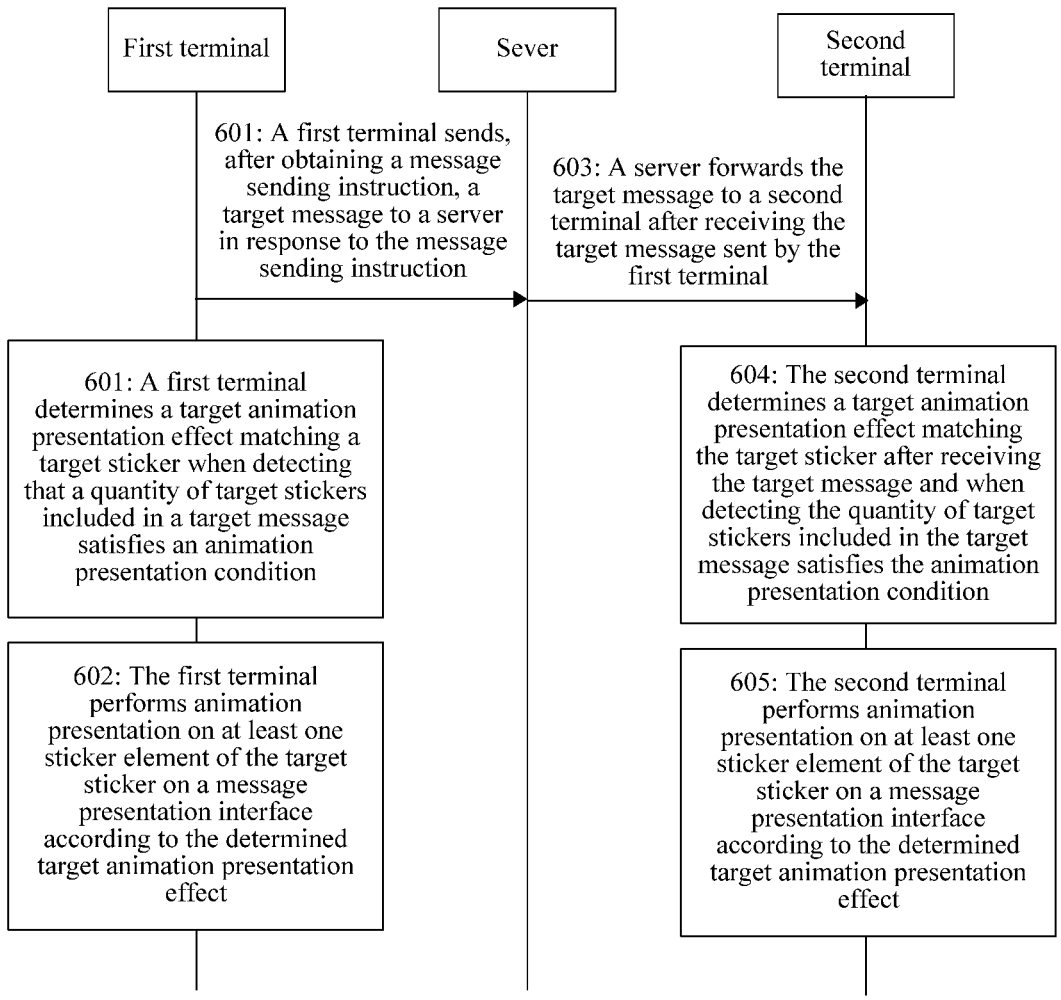
FIG. 6 is a flowchart of a sticker presentation method according to an embodiment of this application.

FIG. 6 is a flowchart of a sticker presentation method according to an embodiment of this application. Using the first situation as an example, referring to FIG. 6, a method process provided in this embodiment of this application includes:

601: A first terminal sends, after obtaining a message sending instruction, a target message to a server in response to the message sending instruction, and determines a target animation presentation effect matching a target sticker when detecting that a quantity of target stickers included in a target message satisfies an animation presentation condition.

This step may be implemented with reference to step 201 and step 202 in the foregoing embodiment and is not described herein again.

602: The first terminal performs animation presentation on at least one sticker element of the target sticker on a message presentation interface according to the determined target animation presentation effect.

This step may be implemented with reference to step 204 in the foregoing embodiment and is not described herein again.

603: A server forwards the target message to a second terminal after receiving the target message sent by the first terminal.

604: The second terminal determines a target animation presentation effect matching the target sticker after receiving the target message and when detecting the quantity of target stickers included in the target message satisfies the animation presentation condition.

This step may be implemented with reference to step 202 in the foregoing embodiment and is not described herein again.

605: The second terminal performs animation presentation on at least one sticker element of the target sticker on a message presentation interface according to the determined target animation presentation effect.

This step may be implemented with reference to step 204 in the foregoing embodiment and is not described herein again.

In the method provided in this embodiment of this application, when a sticker is presented, in addition to performing presentation according to an original presentation effect of the sticker, the terminal may further perform animation presentation on at least one sticker element of the target sticker on a message presentation interface according to an animation presentation effect matching the sticker when a quantity of stickers satisfies a condition for performing animation presentation. Therefore, this sticker presentation manner is more valid, various presentation patterns are provided, and a display effect is good.

Figure 7:
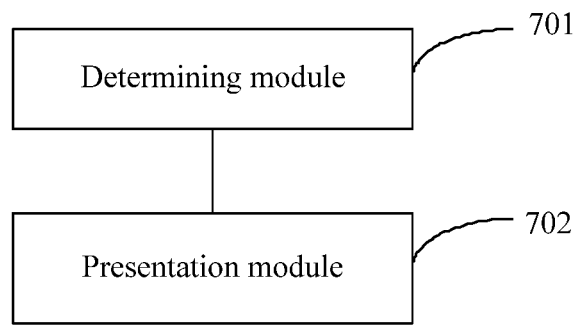
FIG. 7 is a schematic structural diagram of a sticker presentation apparatus according to an embodiment of this application.

FIG. 7 is a schematic structural diagram of a sticker presentation apparatus according to an embodiment of this application. Referring to FIG. 7, the apparatus includes:

a determining module 701, configured to determine target animation presentation effect matching the target sticker after obtaining a message sending instruction and when detecting that a quantity of target stickers included in a sent target message satisfies an animation presentation condition, the target animation presentation effect indicating a presentation manner of at least one sticker element of the target sticker; and a presentation module 702, configured to perform animation presentation on at least one sticker element of the target sticker on a message presentation interface according to the target animation presentation effect, content of the at least one sticker element being consistent with the target sticker.

In another embodiment, the at least one sticker element includes a plurality of sticker elements whose sizes are random, and the presentation module 702 is configured to: control, according to a first presentation manner of the at least one sticker element indicated by the target animation presentation effect, each sticker element in the at least one sticker element to move from a preset start location of the message presentation interface toward a preset finish location according to a preset moving track; and cancel presentation of each sticker element after first preset duration after the movement starts.

In another embodiment, the presentation module 702 is further configured to adjust transparency and a size of each sticker element in a process of moving the sticker element.

In another embodiment, the at least one sticker element includes a sticker element whose size is fixed, and the presentation module 702 is configured to: present the sticker element on the message presentation interface according to a second presentation manner of the at least one sticker element indicated by the target animation presentation effect and magnify the sticker element according to a preset speed until the magnified sticker element has a size of the message presentation interface; and cancel presentation of the magnified sticker element after second preset duration after the magnification starts.

In another embodiment, the presentation module 702 is further configured to adjust transparency of the sticker element in a process of magnifying the sticker element.

In another embodiment, the message presentation interface includes a visual rendering layer; and the presentation module 702 is configured to draw at least one sticker element of the target sticker on the visual rendering layer according to the target animation presentation effect.

In another embodiment, the determining module 701 is configured to determine, when a quantity of target stickers continuously appearing in the target message is not less than a preset threshold, that a condition for performing animation presentation on the target sticker is satisfied.

the determining module 701 is configured to: obtain a target sticker type to which the target sticker belongs; and query a correspondence between a preset sticker type and an animation presentation effect and obtain an animation presentation effect matching the target sticker type, to obtain the target animation presentation effect.

In the apparatus provided in this embodiment of this application, when a sticker is presented, in addition to performing presentation according to an original presentation effect of the sticker, the terminal may further perform animation presentation on at least one sticker element of the target sticker on a message presentation interface according to an animation presentation effect matching the sticker when a quantity of stickers satisfies a condition for performing animation presentation. Therefore, this sticker presentation manner is more valid, various presentation patterns are provided, and a display effect is good.

It should be noted that when the sticker presentation apparatus according to the foregoing embodiment performs sticker presentation, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the sticker presentation apparatus and the sticker presentation method provided in the foregoing embodiments belong to one conception. For the specific implementation process, refer to the method embodiments, and details are not described herein again.

Figure 8:
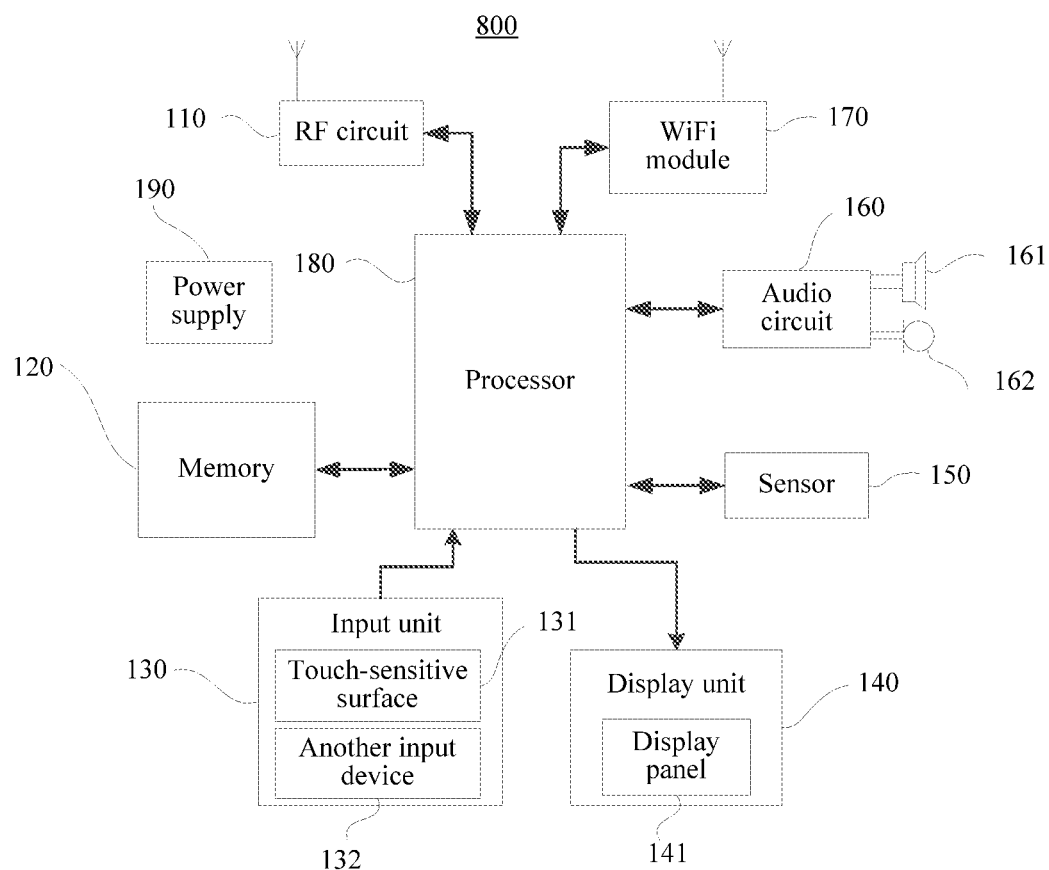
FIG. 8 is a schematic structural diagram of a terminal according to an embodiment of this application.

FIG. 8 is a schematic structural diagram of an electronic terminal according to an embodiment of this application. The electronic terminal may be configured to perform the sticker presentation method provided in the foregoing embodiment. Referring to FIG. 8, the terminal 800 includes:

components such as a radio frequency (RF) circuit 110, a memory 120 including one or more computer-readable storage mediums, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal shown in FIG. 8 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to the use of the terminal 800, and the like. In addition, the memory 120 may include a high-speed random access memory, and may further include a non-volatile memory such as at least one magnetic disk storage device or a flash memory device, or another volatile solid storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical, or track ball signal input related to the user setting and function control. The input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller can receive a command sent by the processor 180 and execute the command. In addition, the touch-sensitive surface 131 may be a resistive, capacitive, infrared, or surface sound wave type touch-sensitive surface. In addition to the touch-sensitive surface 131, the input unit 130 may further include the another input device 132. The another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 800. These graphical user interfaces may include a graph, text, an icon, a video and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 8, the touch-sensitive surface 131 and the display panel 141 are used as two separate components to implement input and output functions, in some embodiments, the touch-sensitive surface 131 and the display panel 141 may be integrated to implement the input and output functions.

The terminal 800 may further include at least one sensor 150 such as an optical sensor, a motion sensor, and other sensors. The optical sensor may include an ambient light sensor and a proximity sensor, where the ambient light sensor may adjust luminance of the display panel 141 according to the luminance of the ambient light, and the proximity sensor may switch off the display panel 141 and/or backlight when the terminal 800 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 800, are not further described herein.

The audio circuit 160, a speaker 161, and a microphone 162 may provide audio interfaces between the user and the terminal 800. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal, converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 800.

WiFi is a short distance wireless transmission technology. The terminal 800 may help, by using the WiFi module 170, the user to receive and send emails, browse a web page, access streaming media, and so on, which provides wireless broadband Internet access for the user.

The processor 180 is a control center of the terminal 800, which is connected to various parts of the entire mobile phone by using various interfaces and lines, and by running or executing a software program and/or module stored in the memory 120 and calling data stored in the memory 120, to perform various functions of the terminal 800 and process data, so as to perform overall monitoring on the mobile phone. Optionally, the processor 180 may include one or more processing cores. Optionally, the processor 180 may integrate an application processor and a modem processor. The application processor mainly processes an operating system, a user interface, an application, and the like, and the modem processor mainly processes wireless communication. It may be understood that the foregoing modem processor may alternatively not be integrated into the processor 180.

The terminal 800 further includes the power supply 190 (such as a battery) for supplying power to the components. Optionally, the power supply may be logically connected to the processor 180 by using a power management system, thereby implementing functions, such as charging, discharging, and power consumption management, by using the power management system. The power supply 190 may further include one or more of a direct current or alternating current power supply, a re-charging system, a power failure detection circuit, a power supply converter or inverter, a power supply state indicator, and any other component.

Although not shown in the figure, the terminal 800 may further include a camera, a Bluetooth module, and the like, which are not further described herein. Specifically, in this embodiment, the display unit of the terminal is a touch screen display, the terminal further includes a memory, the storage medium 120 storing at least one instruction, at least one program, and a code set or an instruction set, and the at least one instruction, the at least one program, and the code set or the instruction set being loaded and executed by the processor to implement the sticker presentation method in the foregoing embodiments.

Figure 9:
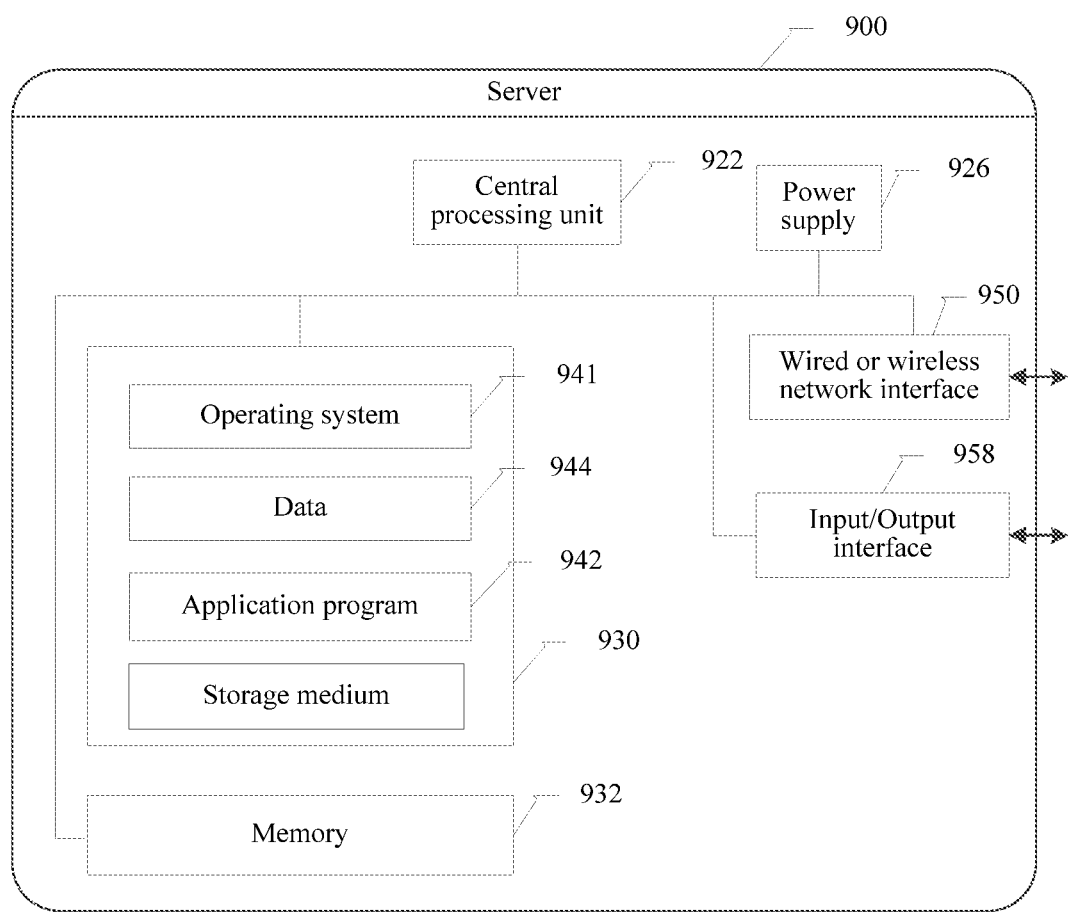
FIG. 9 is a schematic structural diagram of a server according to an embodiment of this application.

FIG. 9 shows a server according to an exemplary embodiment. The server may be configured to implement the sticker presentation method shown in any one of the foregoing exemplary embodiments. Specifically, referring to FIG. 9, the server 900 may vary greatly due to different configurations or performance, and may include one or more central processing units (CPU) 922 (for example, one or more processors), a memory 932, and one or more storage mediums 930 (for example, one or more mass storage devices) that store an application program 942 or data 944. The memory 932 and the storage medium 930 may be transient storages or persistent storages. A program stored in the storage medium 930 may include one or more modules (not shown).

The server 900 may further include one or more power supplies 926, one or more wired or wireless network interfaces 950, one or more input/output interfaces 958, and/or one or more operating systems 941, for example, Windows Server™, Mac OS X™, Unix™, Linux™, or FreeBSD™. The memory 932 stores at least one instruction, at least one program, and a code set or an instruction set, and the at least one instruction, the at least one program, and the code set or the instruction set is loaded and executed by the processor to implement the sticker presentation method in the foregoing embodiments.

According to one aspect of the embodiments of this application, a storage medium is further provided. The storage medium stores at least one instruction, at least one program, and a code set or an instruction set, the at least one instruction, and the at least one program, and the code set or the instruction set is loaded and executed by the processor to implement the foregoing sticker presentation method.

Optionally, in this embodiment, the storage medium may be configured to store a computer program used for performing the following steps:

S1: A first terminal determines target animation presentation effect matching the target sticker after obtaining a message sending instruction and when detecting that a quantity of target stickers included in a sent target message satisfies an animation presentation condition, the target animation presentation effect indicating a presentation manner of at least one sticker element of the target sticker.

S2: Perform animation presentation on at least one sticker element of the target sticker on a message presentation interface according to the target animation presentation effect.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

INDUSTRIAL APPLICABILITY

In this embodiment, a method of determining the target animation presentation effect matching the target sticker after obtaining the message sending instruction and when detecting that a quantity of target stickers included in the sent target message satisfies the animation presentation condition. Therefore, when a sticker is presented, in addition to performing presentation according to an original presentation effect of the sticker, the terminal may further perform animation presentation on at least one sticker element of the target sticker on a message presentation interface according to an animation presentation effect matching the sticker when a quantity of stickers satisfies a condition for performing animation presentation. Therefore, this sticker presentation manner is more valid, various presentation patterns are provided, and a display effect is good.

What is claimed is:

1. A sticker presentation method performed by a first terminal having one or more processors and memory storing a plurality of programs to be executed by the one or more processors, the method comprising:

detecting, by the first terminal, a quantity of an identical target sticker in a single sent target message of an instant messaging application that satisfies a predefined quantity threshold of identical target stickers for triggering an animation presentation condition, wherein the predefined quantity threshold of identical target stickers is greater than one;

determining, by the first terminal, a target animation presentation effect matching the identical target sticker in the single sent target message; and displaying, by the first terminal, an animation presentation on at least one instance of the identical target sticker in a message presentation interface of the instant messaging application according to the target animation presentation effect.

2. The method according to claim 1, wherein the at least one instance of the target sticker comprises a plurality of instances of the target sticker whose sizes are random, and the displaying, by the first terminal, animation presentation on at least one instance of the target sticker on a message presentation interface according to the target animation presentation effect comprises:

controlling, by the first terminal according to a first presentation manner of the at least one instance indicated by the target animation presentation effect, each instance in the at least one instance to move from a preset start location of the message presentation interface toward a preset finish location according to a preset moving track; and canceling, by the first terminal, presentation of each instance after first preset duration after the movement starts.

3. The method according to claim 2, wherein the method further comprises:

adjusting, by the first terminal, transparency and a size of each instance in a process of moving the instance in the message presentation interface.

4. The method according to claim 1, wherein the at least one instance comprises an instance whose size is fixed, and the displaying, by the first terminal, the animation presentation on at least instance of the target sticker on a message presentation interface according to the target animation presentation effect comprises:

presenting, by the first terminal, the instance in the message presentation interface according to a second presentation manner of the at least one instance indicated by the target animation presentation effect and magnifying the instance according to a preset speed until a magnified instance has a size of the message presentation interface; and canceling, by the first terminal, presentation of the magnified instance after second preset duration after the magnification starts.

5. The method according to claim 4, wherein the method further comprises:

adjusting, by the first terminal, transparency of the instance in a process of magnifying the instance in the message presentation interface.

6. The method according to claim 1, wherein the message presentation interface comprises a visual rendering layer; and the displaying, by the first terminal, the animation presentation on at least one instance of the target sticker on a message presentation interface according to the target animation presentation effect comprises:

drawing, by the first terminal, at least one instance of the target sticker on the visual rendering layer according to the target animation presentation effect.

7. The method according to claim 1, wherein the method further comprises:

determining, by the first terminal when a quantity of target stickers continuously appearing in the target message is not less than a preset threshold, that a condition for performing animation presentation on the target sticker is satisfied;

obtaining, by the first terminal, a target sticker type to which the target sticker belongs; and querying, by the first terminal, a correspondence between a preset sticker type and an animation presentation effect and obtaining an animation presentation effect matching the target sticker type, to obtain the target animation presentation effect.

8. A first terminal comprising one or more processors, memory coupled to the one or more processors and a plurality of programs stored in the memory that, when executed by the one or more processors, cause the mobile terminal to perform a plurality of operations comprising:

detecting, by the first terminal, a quantity of an identical target sticker in a single sent target message of an instant messaging application that satisfies a predefined quantity threshold of identical target stickers for triggering an animation presentation condition, wherein the predefined quantity threshold of identical target stickers is greater than one;

determining, by the first terminal, a target animation presentation effect matching the identical target sticker in the single sent target message; and displaying, by the first terminal, an animation presentation on at least one instance of the identical target sticker in a message presentation interface of the instant messaging application according to the target animation presentation effect.

9. The first terminal according to claim 8, wherein the at least one instance of the target sticker comprises a plurality of instances of the target sticker whose sizes are random, and the displaying, by the first terminal, animation presentation on at least one instance of the target sticker on a message presentation interface according to the target animation presentation effect comprises:

controlling, by the first terminal according to a first presentation manner of the at least one instance indicated by the target animation presentation effect, each instance in the at least one instance to move from a preset start location of the message presentation interface toward a preset finish location according to a preset moving track; and canceling, by the first terminal, presentation of each sticker element instance after first preset duration after the movement starts.

10. The first terminal according to claim 9, wherein the plurality of operations further comprises:

adjusting, by the first terminal, transparency and a size of each instance in a process of moving the instance in the message presentation interface.

11. The first terminal according to claim 8, wherein the at least one instance comprises an instance whose size is fixed, and the displaying, by the first terminal, the animation presentation on at least instance of the target sticker on a message presentation interface according to the target animation presentation effect comprises:

presenting, by the first terminal, the instance in the message presentation interface according to a second presentation manner of the at least one instance indicated by the target animation presentation effect and magnifying the instance according to a preset speed until a magnified instance has a size of the message presentation interface; and canceling, by the first terminal, presentation of the magnified instance after second preset duration after the magnification starts.

12. The first terminal according to claim 11, wherein the plurality of operations further comprises:
adjusting, by the first terminal, transparency of the instance in a process of magnifying the instance in the message presentation interface.

13. The first terminal according to claim 8, wherein the message presentation interface comprises a visual rendering layer; and
the displaying, by the first terminal, the animation presentation on at least one instance of the target sticker on a message presentation interface according to the target animation presentation effect comprises:
drawing, by the first terminal, at least one instance of the target sticker on the visual rendering layer according to the target animation presentation effect.

14. The first terminal according to claim 8, wherein the plurality of operations further comprises:
determining, by the first terminal when a quantity of target stickers continuously appearing in the target message is not less than a preset threshold, that a condition for performing animation presentation on the target sticker is satisfied;
obtaining, by the first terminal, a target sticker type to which the target sticker belongs; and
querying, by the first terminal, a correspondence between a preset sticker type and an animation presentation effect and obtaining an animation presentation effect matching the target sticker type, to obtain the target animation presentation effect.

15. A non-transitory computer readable storage medium storing a plurality of machine readable instructions in connection with a first terminal having one or more processors, wherein the plurality of machine readable instructions, when executed by the one or more processors, cause the first terminal to perform a plurality of operations including:
detecting, by the first terminal, a quantity of an identical target sticker in a single sent target message of an instant messaging application that satisfies a predefined quantity threshold of identical target stickers for triggering an animation presentation condition, wherein the predefined quantity threshold of identical target stickers is greater than one;
determining, by the first terminal, a target animation presentation effect matching the identical target sticker in the single sent target message; and
displaying, by the first terminal, an animation presentation on at least one instance of the identical target sticker in a message presentation interface of the instant messaging application according to the target animation presentation effect.

16. The non-transitory computer readable storage medium according to claim 15, wherein the at least one instance of the target sticker comprises a plurality of instances of the target sticker whose sizes are random, and the displaying, by the first terminal, animation presentation on at least one instance of the target sticker on a message presentation interface according to the target animation presentation effect comprises:

controlling, by the first terminal according to a first presentation manner of the at least one instance indicated by the target animation presentation effect, each instance in the at least one instance to move from a preset start location of the message presentation interface toward a preset finish location according to a preset moving track; and
canceling, by the first terminal, presentation of each instance after first preset duration after the movement starts.

17. The non-transitory computer readable storage medium according to claim 16, wherein the plurality of operations further comprises:
adjusting, by the first terminal, transparency and a size of each instance in a process of moving the instance in the message presentation interface.

18. The non-transitory computer readable storage medium according to claim 15, wherein the at least one instance comprises an instance whose size is fixed, and the displaying, by the first terminal, the animation presentation on at least instance of the target sticker on a message presentation interface according to the target animation presentation effect comprises:
presenting, by the first terminal, the instance in the message presentation interface according to a second presentation manner of the at least one instance indicated by the target animation presentation effect and magnifying the instance according to a preset speed until a magnified instance has a size of the message presentation interface; and
canceling, by the first terminal, presentation of the magnified instance after second preset duration after the magnification starts.

19. The non-transitory computer readable storage medium according to claim 15, wherein the message presentation interface comprises a visual rendering layer; and
the displaying, by the first terminal, the animation presentation on at least one instance of the target sticker on a message presentation interface according to the target animation presentation effect comprises:
drawing, by the first terminal, at least one instance of the target sticker on the visual rendering layer according to the target animation presentation effect.

20. The non-transitory computer readable storage medium according to claim 15, wherein the plurality of operations further comprises:
determining, by the first terminal when a quantity of target stickers continuously appearing in the target message is not less than a preset threshold, that a condition for performing animation presentation on the target sticker is satisfied;
obtaining, by the first terminal, a target sticker type to which the target sticker belongs; and
querying, by the first terminal, a correspondence between a preset sticker type and an animation presentation effect and obtaining an animation presentation effect matching the target sticker type, to obtain the target animation presentation effect.

* * * * *